United States Patent
Hamlin et al.

(10) Patent No.: US 10,773,619 B1
(45) Date of Patent: Sep. 15, 2020

(54) SEATING ASSEMBLY COVER

(71) Applicant: Ford Global Technologies, LLC, Dearborn, MI (US)

(72) Inventors: Timothy Owen Hamlin, Warren, MI (US); Rebecca Ann Olsen, Lake Orion, MI (US); Kanav Mahotra, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/298,025

(22) Filed: Mar. 11, 2019

(51) Int. Cl.
*B60N 2/60* (2006.01)

(52) U.S. Cl.
CPC ......... *B60N 2/6018* (2013.01); *B60N 2/6027* (2013.01)

(58) Field of Classification Search
CPC ...... B60N 2/6018; B60N 2/6027; B60N 2/60; B60N 2/58; B60N 2/5816; B60N 2/5825
USPC .................................................... 297/228.13
See application file for complete search history.

(56) References Cited

U.S. PATENT DOCUMENTS

| | | | | |
|---|---|---|---|---|
| 4,317,591 A * | 3/1982 | Ramsey | ............... | B60N 2/5825 297/452.6 |
| 4,558,905 A * | 12/1985 | Natori | ..................... | A47C 7/748 297/452.6 |
| 4,844,539 A | 7/1989 | Selbert | | |
| 6,817,664 B1 | 11/2004 | Tang et al. | | |
| 7,390,059 B2 * | 6/2008 | Brockschnieder | ... | B60N 2/5816 297/228.13 |
| 7,488,036 B2 | 2/2009 | Tache | | |
| 8,025,333 B2 | 9/2011 | Yasuda | | |
| 8,465,093 B2 | 6/2013 | Janowski | | |
| 9,827,891 B2 | 11/2017 | Conn et al. | | |
| 2007/0040426 A1 | 2/2007 | Kenny | | |
| 2010/0176647 A1 * | 7/2010 | Brockschnieder | ... | B60N 2/5816 297/452.58 |
| 2015/0089773 A1 * | 4/2015 | Kheil | ...................... | B29C 43/28 24/114.5 |
| 2015/0130255 A1 * | 5/2015 | Kheil | ................... | B60N 2/5891 297/452.58 |
| 2017/0253157 A1 * | 9/2017 | Nagasawa | ................ | B60N 2/60 |
| 2018/0022254 A1 | 1/2018 | Nishino et al. | | |
| 2018/0134189 A1 * | 5/2018 | Iwasaki | ................. | B60N 2/914 |
| 2019/0160991 A1 * | 5/2019 | Krause | ..................... | B60N 2/72 |

FOREIGN PATENT DOCUMENTS

| | | |
|---|---|---|
| CN | 2735806 Y | 10/2005 |
| CN | 2014146479 U | 2/2015 |
| FR | 2781733 B1 | 9/2000 |
| FR | 2850848 A1 | 8/2004 |
| FR | 2911821 B1 | 4/2009 |
| FR | 2914594 B1 | 7/2009 |

\* cited by examiner

*Primary Examiner* — Mark R Wendell
(74) *Attorney, Agent, or Firm* — David Coppiellie; Price Heneveld LLP

(57) ABSTRACT

A vehicle seating assembly includes a cushion with a seating surface. An elongated trench extends into the seating surface. A primary fastener part is disposed in the elongated trench, and a secondary fastener part is disposed around a cushion perimeter. A cover includes first and second fastener parts, wherein the primary fastener part and the first fastener part are selectively attachable to form a first disengageable seal. The secondary fastener part and the second fastener part are selectively attachable to form a second disengageable seal.

20 Claims, 20 Drawing Sheets

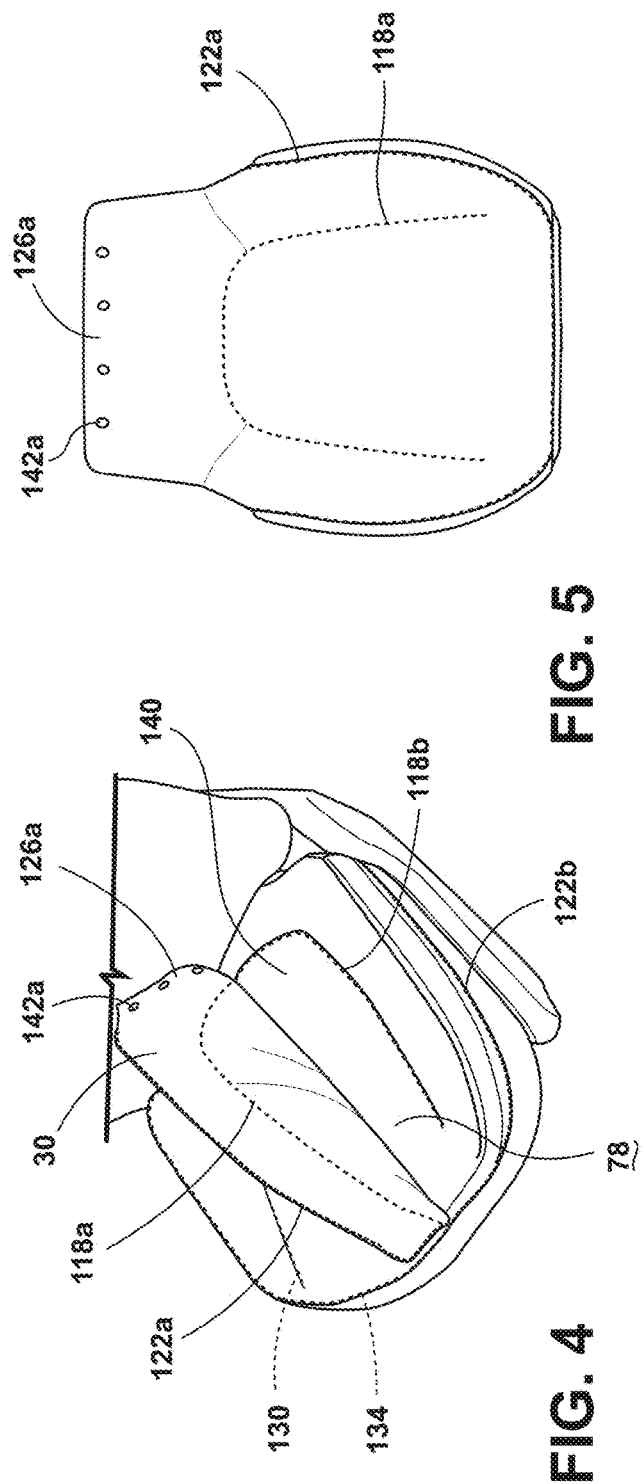
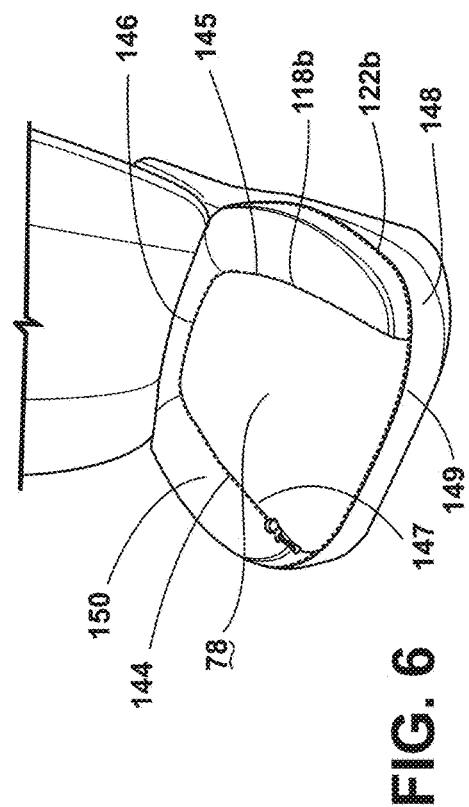
FIG. 4
FIG. 5
FIG. 6

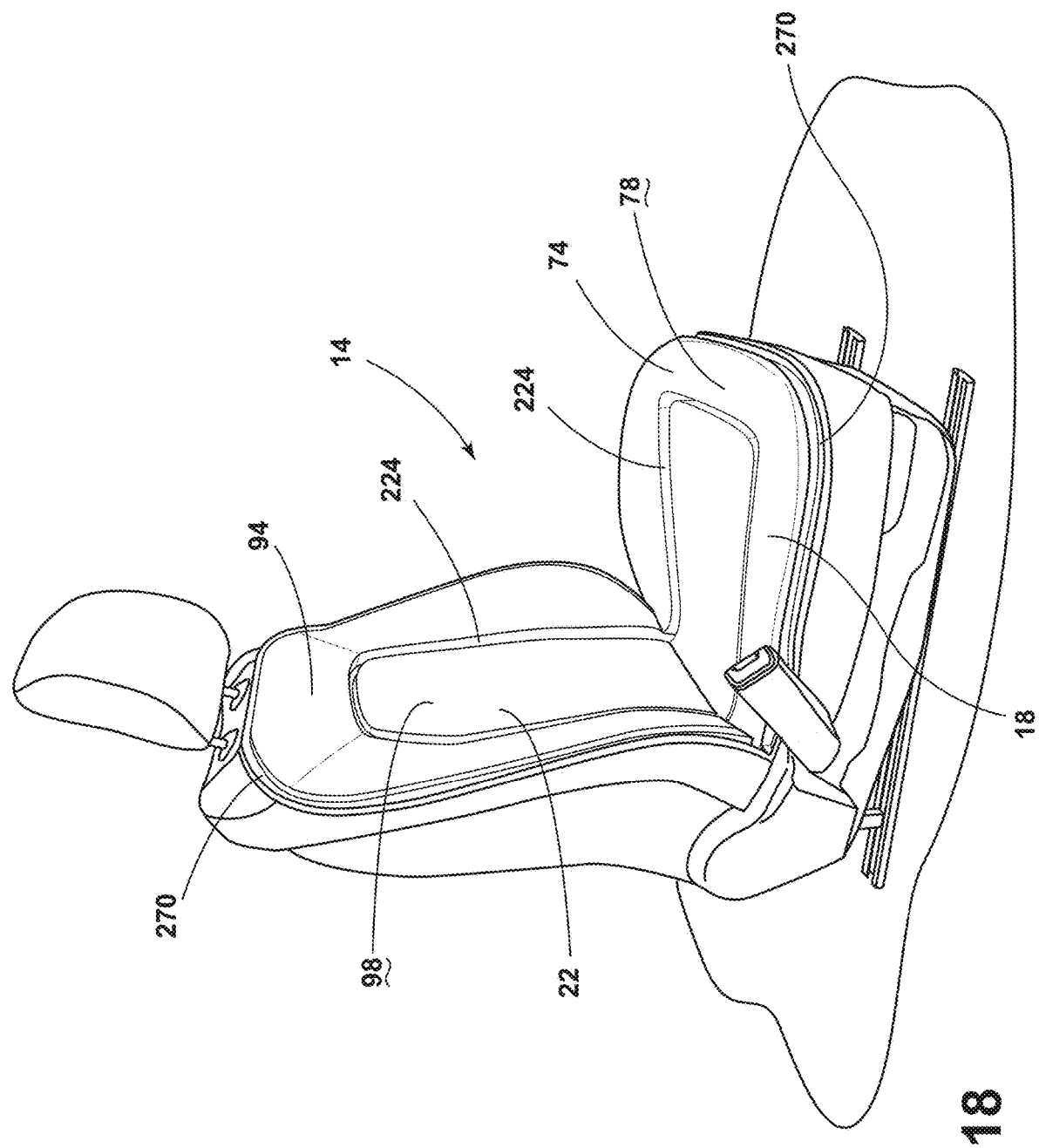

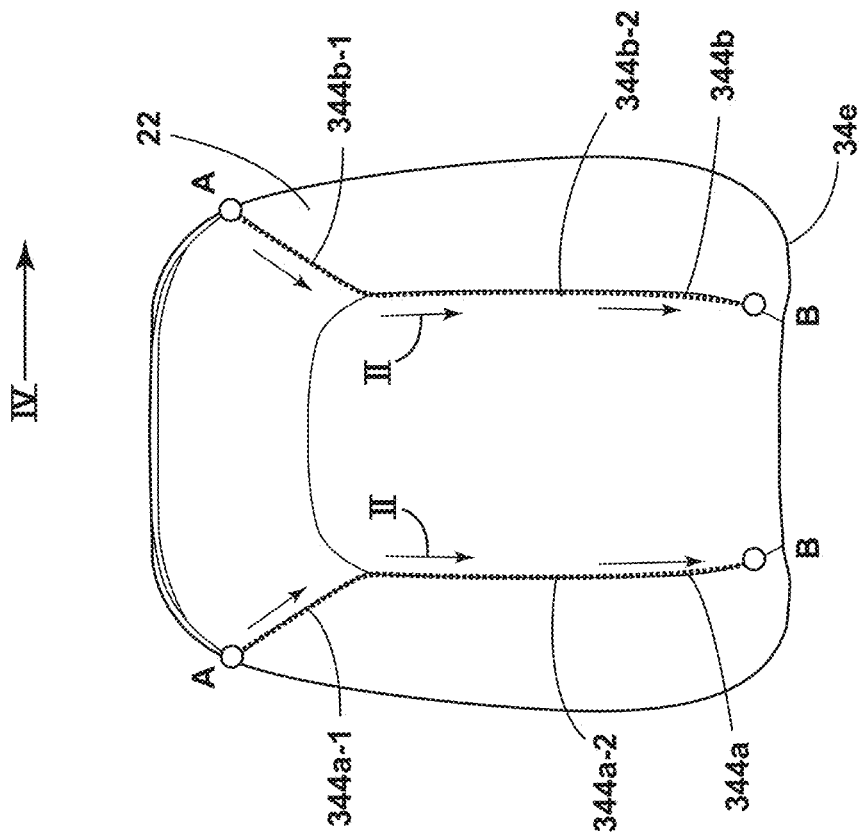
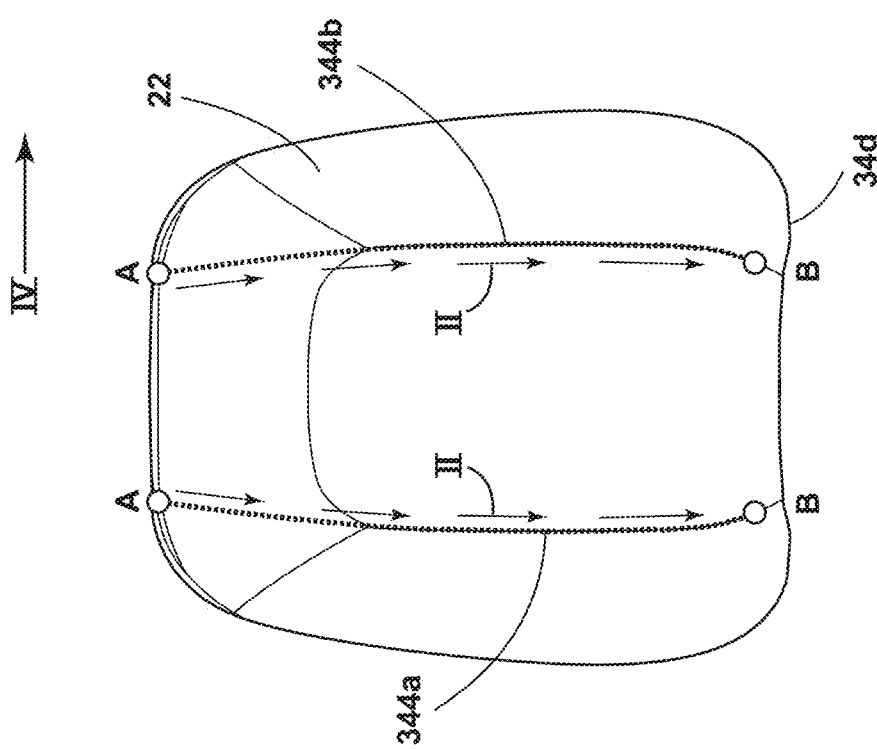
FIG. 22D
FIG. 22C

SEATING ASSEMBLY COVER

FIELD OF THE DISCLOSURE

The present disclosure generally relates to seating assembly covers for a vehicle, and more particularly, to removable covers for a vehicle seating assembly.

BACKGROUND OF THE DISCLOSURE

Vehicle seating assemblies may include removable covers. Removable seating assembly covers may be used to change the visual appearance of the seating assembly, or provide variations in seat trim functionality.

SUMMARY OF THE DISCLOSURE

According to a first aspect of the present disclosure, a vehicle seating assembly includes a cushion with a seating surface. An elongated trench extends into the seating surface. A primary fastener part is disposed in the elongated trench, and a secondary fastener part is disposed around a cushion perimeter. A cover includes first and second fastener parts, wherein the primary fastener part and the first fastener part are selectively attachable to form a first disengageable seal. The secondary fastener part and the second fastener part are selectively attachable to form a second disengageable seal.

Embodiments of the first aspect of the disclosure can include any one or a combination of the following features:
- a supporting structure disposed behind the cushion;
- an attachment assembly extending between the primary fastener part disposed in the elongated trench and the supporting structure;
- wherein the attachment assembly includes a hog ring, a first elongated member, and a second elongated member;
- wherein the hog ring includes opposing first and second hook portions, wherein the first elongated member is disposed in the first hook portion, and wherein the second elongated member is disposed in the second hook portion;
- wherein the primary fastener part is attached to the first elongated member;
- wherein the second elongated member is attached to the supporting structure;
- wherein the supporting structure includes a seating assembly frame;
- wherein the primary and secondary fastener parts comprise primary and secondary zipper parts;
- wherein the first and second fastener parts comprise first and second zipper parts;
- wherein the first disengageable seal includes a first zipper assembly and wherein the second disengageable seal includes a second zipper assembly; and/or
- wherein the seating surface comprises at least one of a seat surface and a seatback surface.

According to a second aspect of the present disclosure, a vehicle seating assembly includes a supporting structure. An intermediate member includes a seating surface, a cover, a selectively engageable first zipper assembly, and a selectively engageable second zipper assembly. The first zipper assembly extends between the removable cover and an attachment assembly secured to the supporting structure. The second zipper assembly extends between the removable cover and the seat.

Embodiments of the second aspect of the disclosure can include any one or a combination of the following features:
- wherein the intermediate member includes a cushion and wherein first and second trenches are disposed in the cushion behind the respective first and second zipper assemblies;
- wherein a primary zipper part of the first zipper assembly is disposed in the first trench;
- wherein the first trench includes a first width at the bottom of the first trench and a second width at the top of the first trench;
- wherein the second width is greater than the first width; and/or
- a third disengageable seal disposed between the cover and the seating surface.

According to a third aspect of the present disclosure, a vehicle seating assembly includes a cover with first and second zipper parts. A cushion includes a first elongated trench for receiving an attachment assembly that extends from a vehicle member and is coupled to a primary zipper part. A second elongated trench is proximate a secondary zipper part. The first zipper part and the primary zipper part are selectively attachable, and the second zipper part and the secondary zipper part are selectively attachable.

Embodiments of the third aspect of the disclosure can include any one or a combination of the following features:
- wherein the first zipper part and the primary zipper part form a first zipper assembly, wherein the second zipper part and the secondary zipper part form a second zipper assembly, wherein the second elongated trench extends around a portion of the outer perimeter of the cushion, and wherein the second zipper assembly is disposed over the second elongated trench.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a perspective view a portion of a seating assembly with a partially detached seat cover;

FIG. 5 is a back elevational view of a seat cover;

FIG. 6 is a perspective view of a portion of a seating assembly without a seat cover;

FIG. 18 is a perspective view of a seating assembly without a seating assembly cover and with first and second seat trenches and first and second seatback trenches;

FIG. 22C is a front elevational view of a seatback cover showing the directions of fastener actuation;

FIG. 22D is a front elevational view of a seatback cover showing the directions of fastener actuation.

DETAILED DESCRIPTION OF THE PREFERRED EMBODIMENTS

Figure 1:
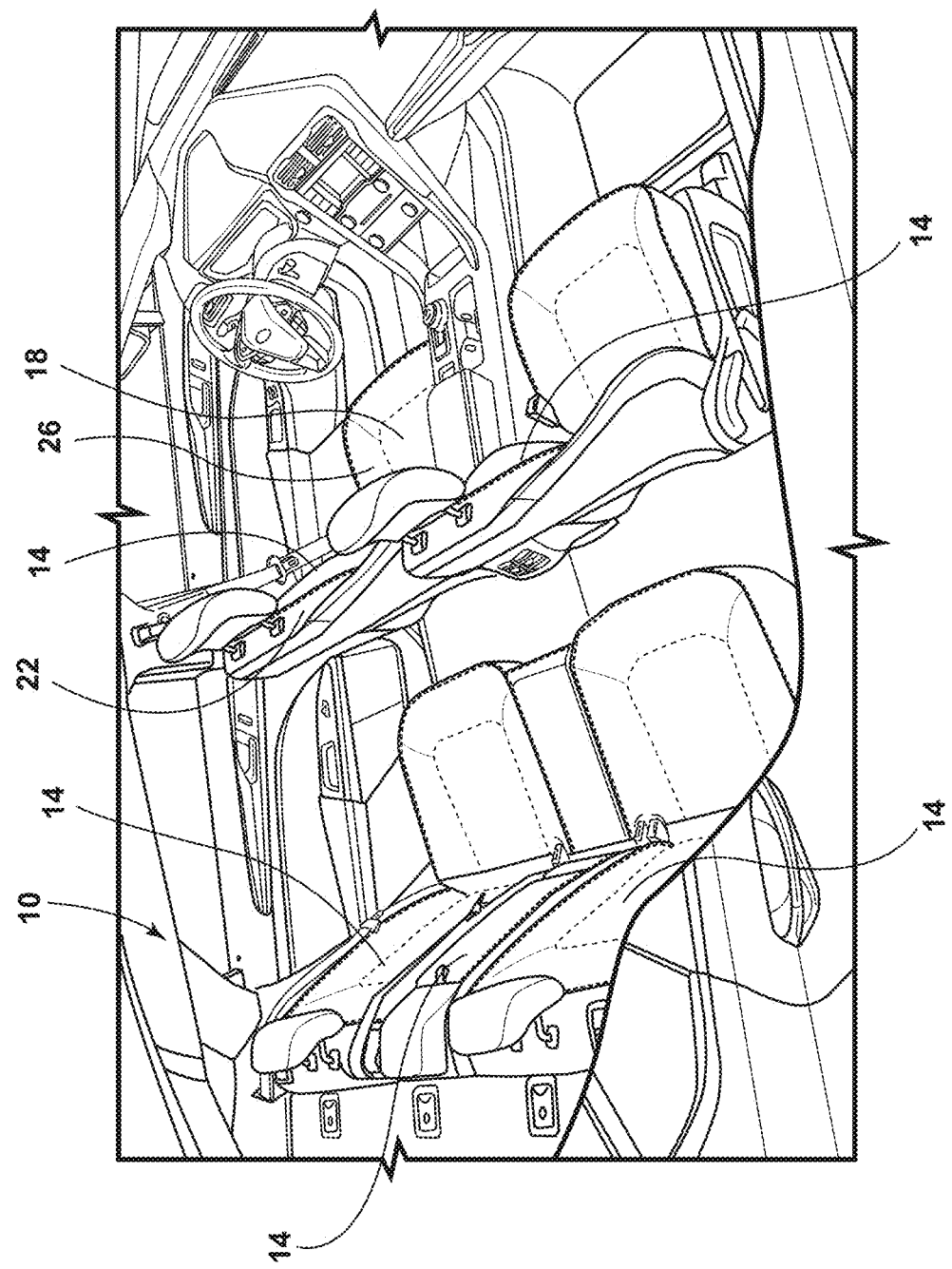
FIG. 1 is a side perspective view of a vehicle interior with seating assemblies including seating assembly covers.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the vehicle seating assemblies described below and shown in the attached figures, a vehicle seating assembly may be described from the vantage point of an occupant seated in the seating assembly. The side of a seating assembly disposed on a right side of a seated occupant may be referred to as a right side or a first side of the seating assembly. The side of the seating assembly disposed on a left side of a seated occupant may be referred to as a left side or a second side of the seating assembly.

Referring to FIG. 1, a vehicle interior 10 is shown. The vehicle interior 10 may include five seating assemblies. Each seating assembly 14 may include a seat 18 and a seatback 22. Each seating assembly 14 may include a seating assembly cover 26. A seating assembly cover 26 may include a seat cover 30 for the seat 18 and a seatback cover 34 for the seatback 22. The seat cover 30 may be referred to as the removable trim cover of the seat 18. The seatback cover 34 may be referred to as the removable trim cover of the seatback 22.

Vehicle occupants may desire a change in the appearance of a vehicle interior 10. The appearance of a vehicle interior 10 may be changed by changing the seating assembly covers 26. Also, occupants may want to replace dirty, ripped, or damaged seating assembly covers 26 with new seating assembly covers 26. Seating assembly covers 26 may be sold as aftermarket items. Seating assembly covers 26 may also be installed during the seating assembly manufacturing process. During the seating assembly manufacturing process, operators may conveniently attach the seating assembly covers 26 to the seating assemblies. When ordering a car from an Original Equipment Manufacturer, customers may be able select a seating assembly cover 26 from a wide selection of available seating assembly covers 26.

During the design process of a removable seating assembly cover 26 and the seating assembly 14, an appropriate fit of the seating assembly cover 26 on the seating assembly 14 should be considered. A removable seating assembly cover 26 may be designed so that it may be used in a vehicle for several years or longer. Therefore, consideration may be given to optimal locations of zipper assemblies and other fastener assemblies on the seating assembly cover 26 and the seating assembly 14. Also, consideration may be given to optimal design of seats 18 and seatbacks 22 for receiving a seating assembly cover 26. Further, secure attachment of the seating assembly cover 26 to the seating assembly 14 may be evaluated. Additionally, it may be desirable to design the seating assembly cover 26 so that it is convenient for an operator to install during a seating assembly manufacturing process. Accordingly, a seating assembly cover 26 may incorporate many features that may increase customer and operator satisfaction.

Figure 2:
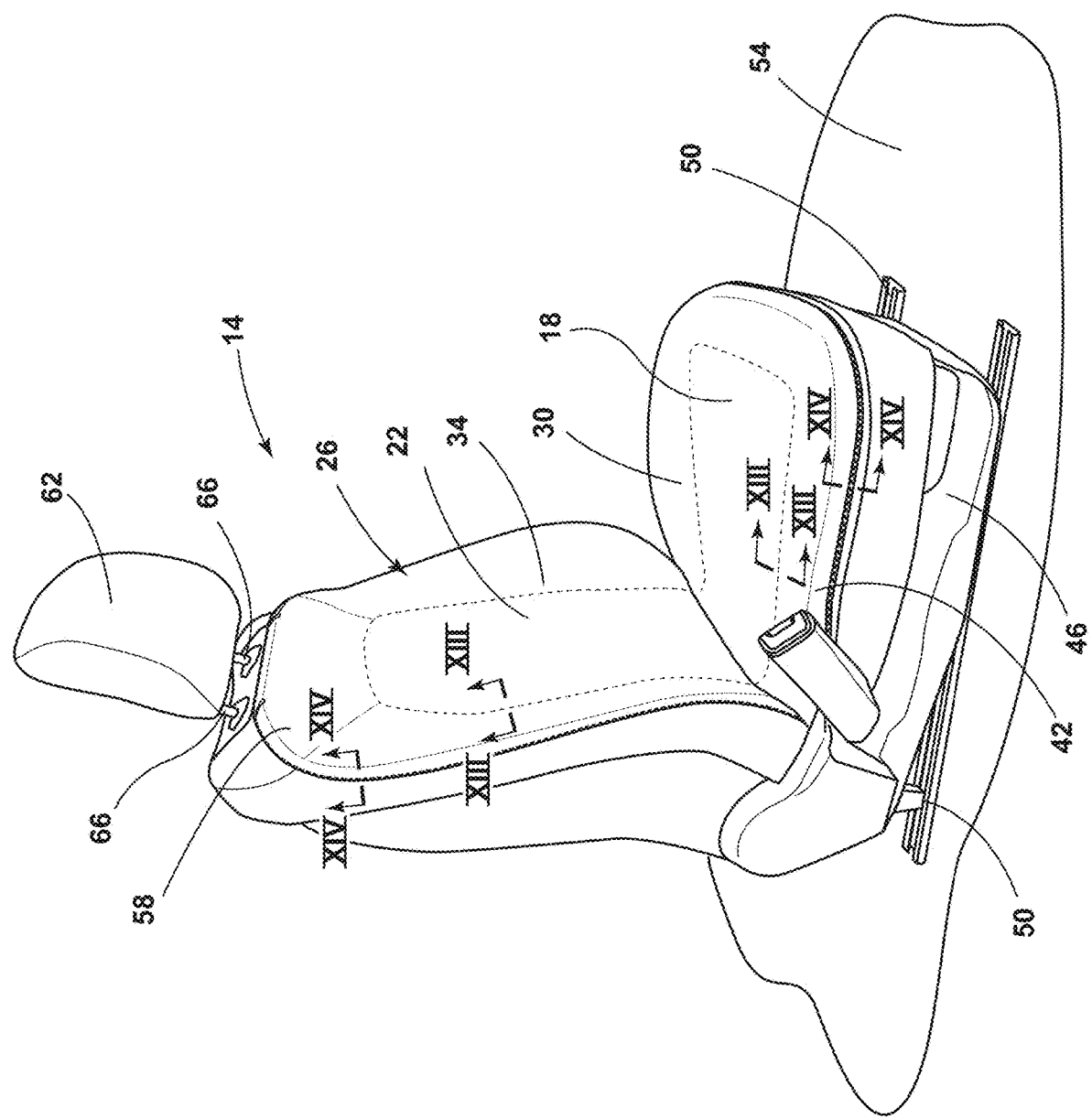
FIG. 2 is a side perspective view of a seating assembly with a seating assembly cover.

Referring now to FIG. 2, as previously discussed, the seating assembly 14 may include a seat 18 and a seatback 22. The seat 18 may include a seat cover 30. The seat 18 may be mounted on a support 46. The support 46 may be configured to slide along rails 50 disposed on a vehicle floor 54. The seatback 22 may include a seatback cover 34. A headrest 62 may extend from the seatback 22. Headrest guides may extend into the seatback 22. The headrest guides may receive the headrest posts 66.

Figure 3:
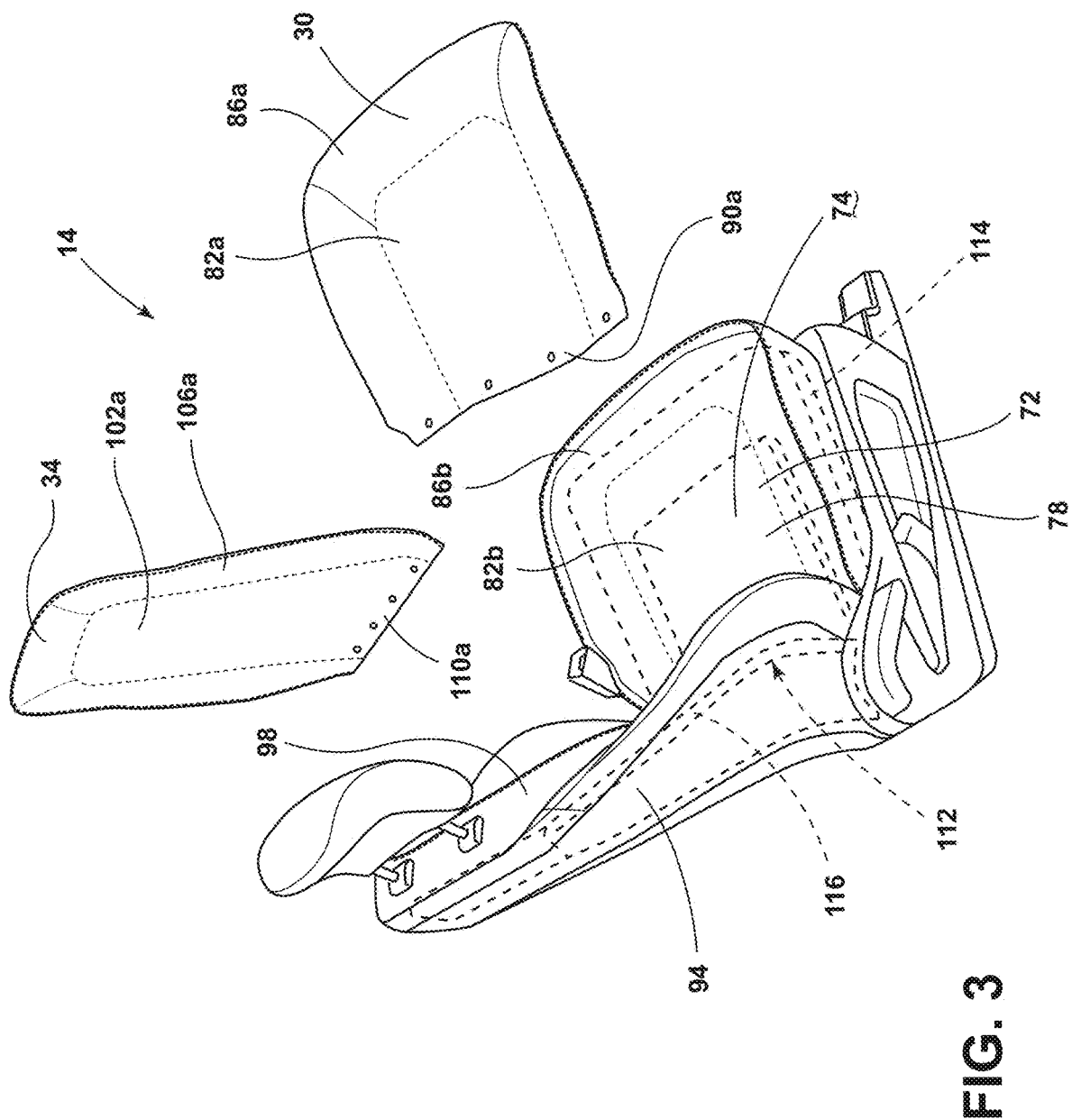
FIG. 3 is an exploded view of a seating assembly with a detached seat cover and a detached seatback cover.

Referring now to FIG. 3, the seating assembly 14 is shown with a seat cover 30 and a seatback cover 34 detached from the seating assembly 14. A seat cushion 74 may be disposed below the removable seat cover 30. The seat cushion 74 may include a seat surface 78. The seat cover 30 may include an inner portion 82a and an outer portion 86a. The seat surface 78 may include an inner portion 82b and an outer portion 86b. The seat cover 30 may also include a seat flap 90a. The seat surface 78 may include a receiving area 90b for the seat flap 90a.

With continued reference to FIG. 3, a seatback cushion 94 may be disposed below the removable seatback cover 34. The seatback cushion 94 may include a seatback surface 98. The seatback cover 34 may include an inner portion 102a and an outer portion 106a. The seatback surface 98 may include an inner portion 102b and an outer portion 106b. The seatback cover 34 may include a seatback flap 110a. The seatback surface 98 may include a receiving area 110b for the seatback flap 110a.

With continued reference to FIG. 3, the seating assembly 14 may include a seating assembly frame 112. The seating assembly frame 112 may include a seat frame 114 for supporting the seat cushion 74. The seating assembly frame 112 may include a seatback frame 116 for supporting the seatback cushion 94. The seating assembly frame 112 may also be referred to as a supporting structure for the seating assembly 14. The seat frame 114 may also be referred to as a supporting structure for the seat 18. The seatback frame 116 may also be referred to as a supporting structure for the seatback 22.

Referring to FIGS. 4-8, various figures of the seat cover 30 and the seat cushion 74 are shown to illustrate the operation of the seat cover 30. With reference to FIG. 4, the seat cover 30 is shown detached from the seat surface 78. The seat cover 30 may include a first fastener part 118a disposed in an inner portion 82a of the seat cover 30. The seat cover 30 may include a second fastener part 122a disposed along an outer portion 86a of the seat cover 30. The seat surface 78 may include a primary fastener part 118b disposed in an inner portion 82b of the seat surface 78. The seat surface 78 may include a secondary fastener part 122b disposed along an outer portion 86b of the seat surface 78. The seat cover 30 may include a third fastener part 126a that may be disposed at the rear of the seat cover 30. The seat surface 78 may include a tertiary fastener part 126b that may be disposed at the rear of the seat 18. The first fastener part 118a of the seat cover 30 may be joined to the primary fastener part 118b of the seat surface 78 to form a first disengageable seal 130. The second fastener part 122a of the seat cover 30 may be joined to the secondary fastener part 122b of the seat surface 78 to form a second disengageable seal 134. The third fastener part 126a of the seat cover 30 may be joined to the tertiary fastener part 126b of the seat surface 78 to form a third disengageable seal 138.

In the example shown in FIG. 4, the first fastener part 118a may include a first zipper part, the second fastener part 122a may include a second zipper part, the primary fastener part 118b may include a primary zipper part, and the secondary fastener part 122b may include a secondary zipper part. The third fastener part 126a may include snaps 142a. The tertiary fastener part 126b may include protrusions 142b for receiving the snaps 142a. The first disengageable seal 130 may be referred to as a first zipper assembly. The second disengageable seal 134 may be referred to as a second zipper assembly. The third disengageable seal 138 may be referred to as a snap assembly. A fixed inner trim seat cover 140 may be disposed on the seat 18.

Referring to FIG. 5, a back of the seat cover 30 is shown. The back of the seat cover 30 may include the first fastener part 118a, the second fastener part 122a, and the third fastener part 126a.

Referring to FIG. 6, the seat cushion 74 is shown without the seat cover 30. The seat cushion 74 may include the primary fastener part 118b and the secondary fastener part 122b. In the example shown, a first bolster 150 may extend between a first side 154 of the seat 18 and an inner portion 82b of the seat 18. A second bolster 158 may extend between a second side 162 of the seat 18 and an inner portion 82b of the seat 18. A first segment 144 of the primary fastener part 118b may extend between the first bolster 150 and the inner portion 82b of the seat 18. A second segment 145 of the primary fastener part 118b may extend between the second bolster 158 and the inner portion 82b of the seat 18. A third segment 146 may extend between the first segment 144 and the second segment 145. In one example, the primary fastener part 118b may be generally U-shaped 147. A secondary fastener part 122b may be disposed on an outer portion 86b of the seat 18. In some examples, the secondary fastener part 122b may be disposed around an outside perimeter 149 of the seat 18.

Figure 7:
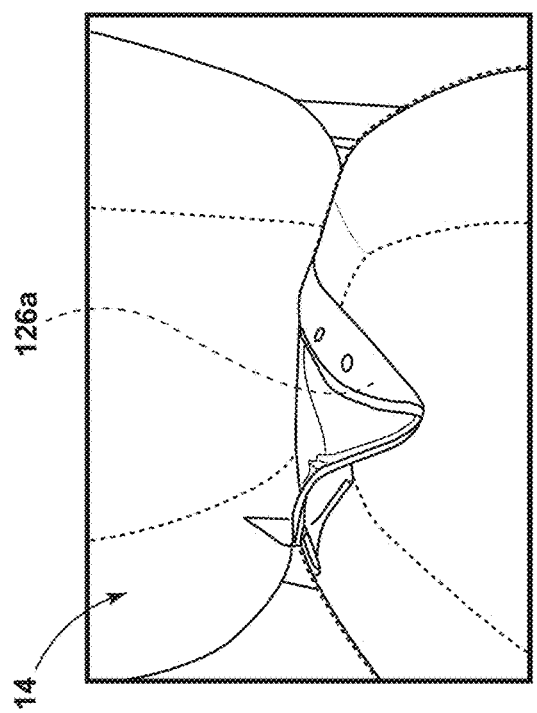
FIG. 7 is a perspective view of a portion of a seating assembly with a partially removed seat cover.

Referring to FIG. 7, a partial view of the seat cover 30 is shown with the third fastener part 126a extending from the bite line 166.

Figure 8:
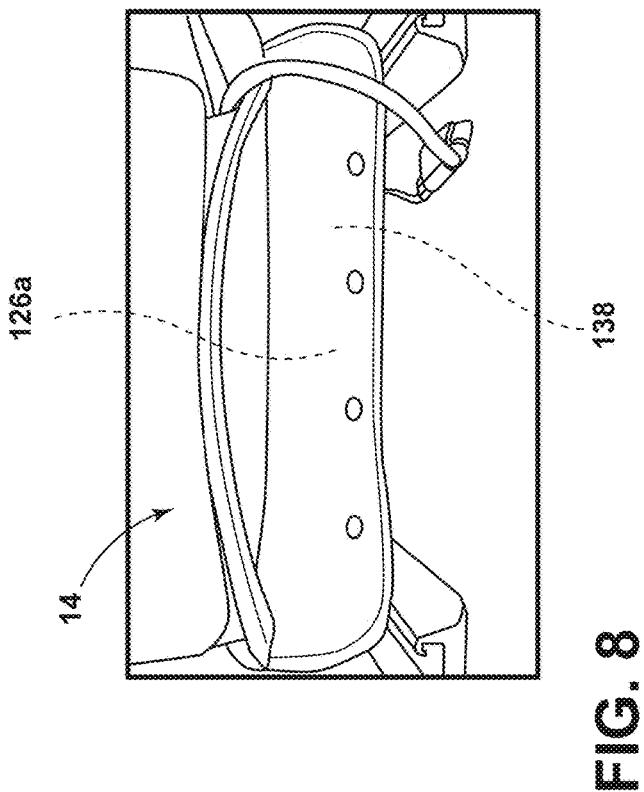
FIG. 8 is a rear elevational view of a portion of a seating assembly with a seat cover.

Referring now to FIG. 8, a back view of the seating assembly 14 is shown with the third fastener part 126a attached to the seat 18.

With reference to FIGS. 9-13, various figures of the seatback cover 34 and the seatback cushion 94 are shown to illustrate the operation of the seatback cover 34. With continued reference to FIG. 9, the seatback cover 34 is shown detached from the seatback surface 98. The seatback cover 34 may include a first fastener part 168a disposed in an inner portion 102a of the seatback cover 34. The seatback cover 34 may include a second fastener part 172a disposed along an outer portion 106a of the seatback cover 34. The seatback surface 98 may include a primary fastener part 168b disposed in an inner portion 102b of the seatback surface 98. The seatback surface 98 may include a secondary fastener part disposed along an outer portion 106b of the seatback surface 98. The seatback cover 34 may include a third fastener part 176a that may be disposed at the bottom of the seatback cover 34. The seatback surface 98 may include a tertiary fastener part 176b that may be disposed at the bottom of the seatback 22. The first fastener part 168a of the seatback cover may be joined to the primary fastener part 168b of the seatback surface 98 to form a first disengageable seal 180. The second fastener part 172a of the seatback cover 34 may be joined to the secondary fastener part 172b of the seatback 22 surface to form a second disengageable seal 184. The third fastener part 176a of the seatback cover 34 may be joined to the tertiary fastener part 176b of the seatback surface 98 to form a third disengageable seal 188. A fixed inner trim seatback cover 190 may be disposed on the seatback 22.

Figure 9:
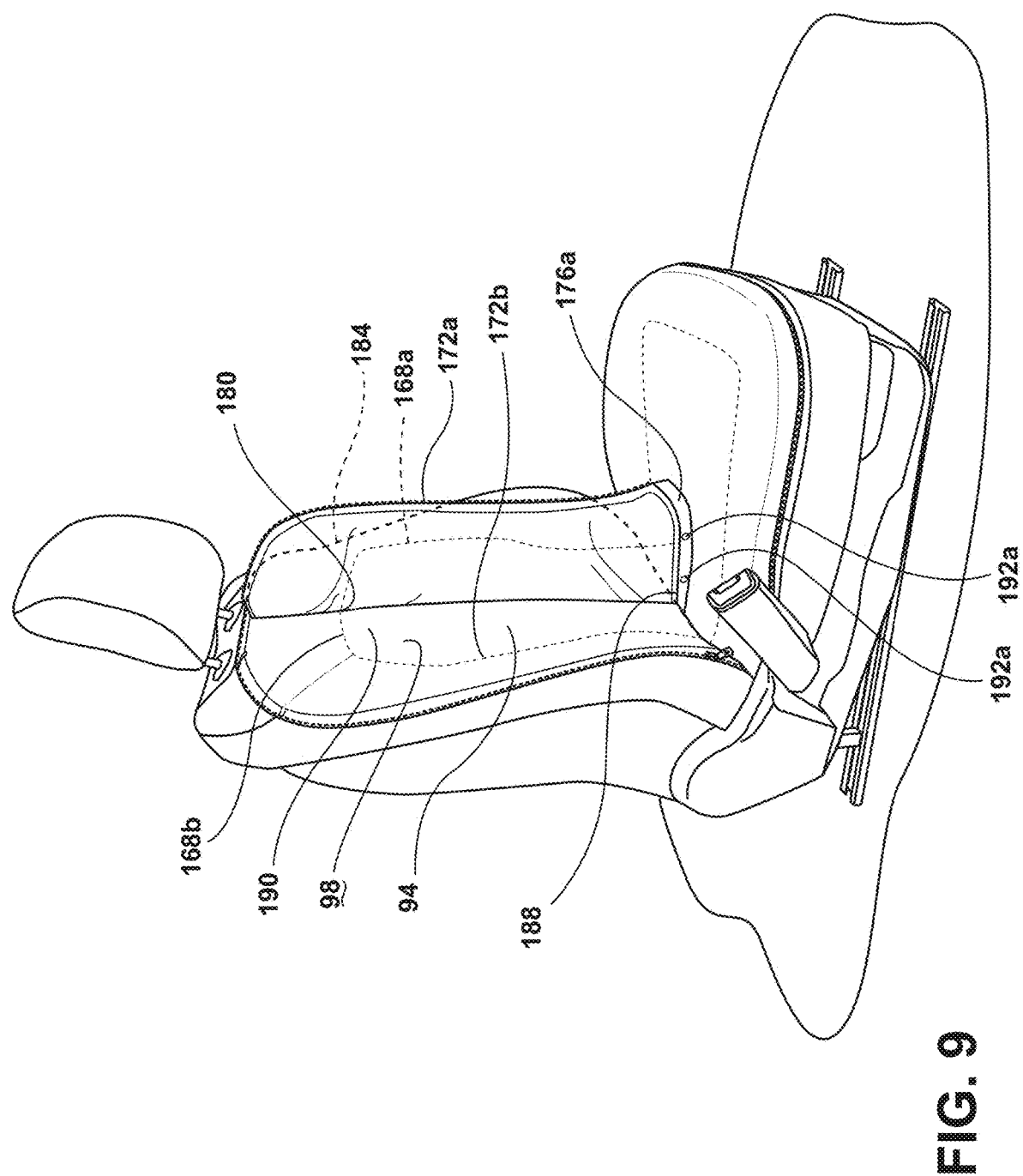
FIG. 9 is a perspective view of a seating assembly with a partially detached seatback cover.

In the example shown in FIG. 9, the first fastener part 168a may include a first zipper part, the second fastener part 172a may include a second zipper part, the primary fastener part 168b may include a primary zipper part, and the secondary fastener part 172b may include a secondary zipper part. The third fastener part 176a may include snaps 192a. The tertiary fastener part 176b may include protrusions 192b for receiving the snaps 192a. The first disengageable seal 180 may be referred to as a first zipper assembly. The second disengageable seal 184 may be referred to as a second zipper assembly. The third disengageable seal 188 may be referred to as a snap assembly.

Figure 10:
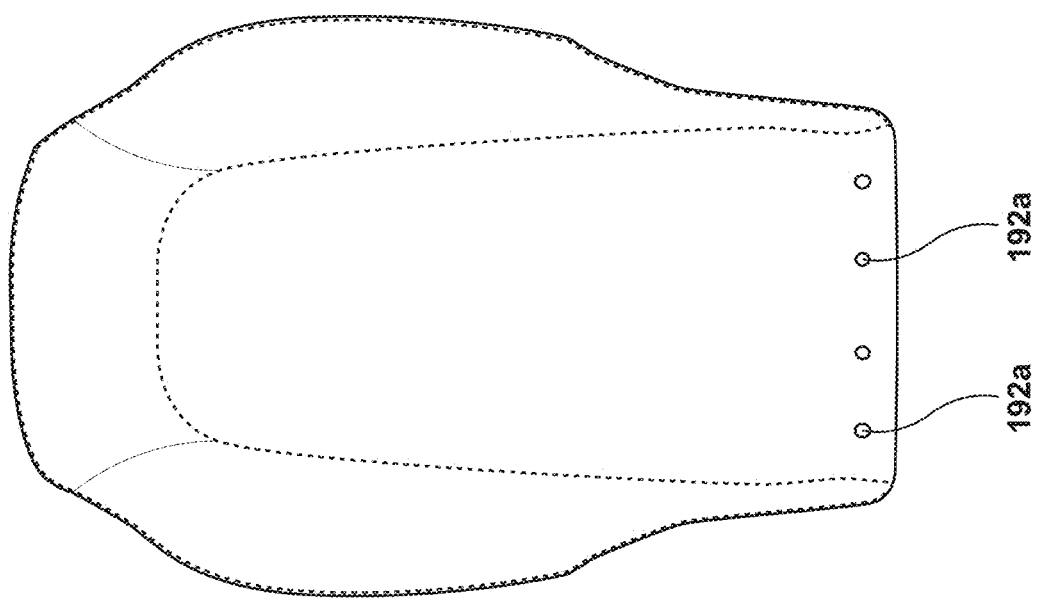
FIG. 10 is a back elevational view of a seatback cover.

Referring to FIG. 10, a back of the seatback cover 34 is shown. The back of the seatback cover 34 may include a first fastener part 168a, a second fastener part 172a, and a third fastener part 176a.

Figure 11:
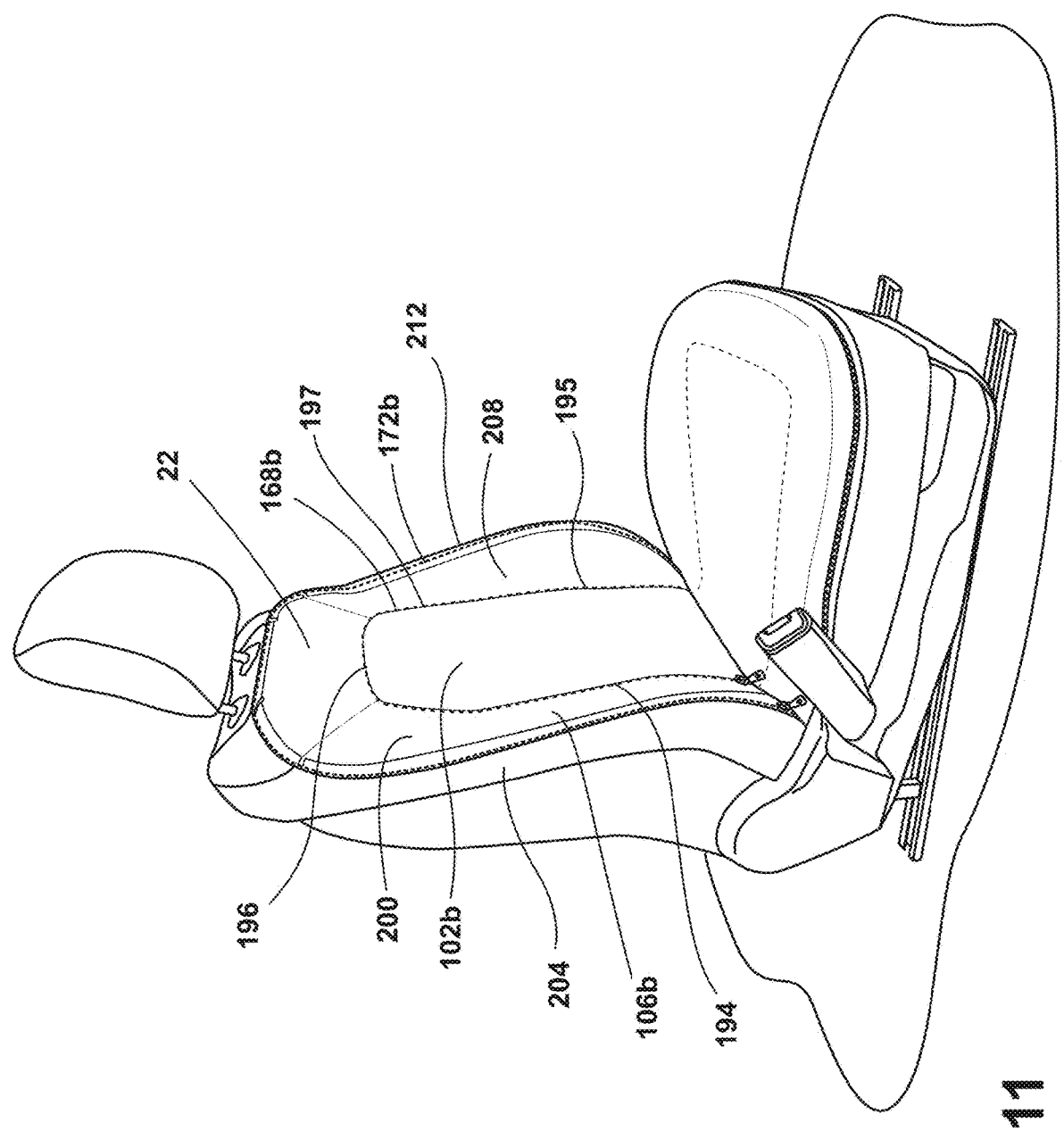
FIG. 11 is a perspective view of a seating assembly without a seatback cover.

Referring to FIG. 11, the seatback cushion 94 is shown without the seatback cover 34. The seatback cushion 94 may include a primary fastener part 168b and a secondary fastener part 172b. In the example shown, a first bolster 200 extends between the first side 204 of the seatback 22 and the inner portion 102b of the seatback 22. A second bolster 208 extends between the second side 212 of the seatback 22 and the inner portion 102b of the seatback 22. The primary fastener part 168b may be generally U-shaped. A secondary fastener part 172b may be disposed on an outer portion 106b of the seatback 22. A first segment 194 of the primary fastener part 168b may extend between the first bolster 200 and the inner portion 102a of the seatback 22. A second segment 195 of the primary fastener part 168b may extend between the second bolster 208 and the inner portion 102b of the seatback 22. A third segment 196 may extend between the first segment 194 and the second segment 195. In one example, the primary fastener part 168b may be generally U-shaped 197.

Figure 12:
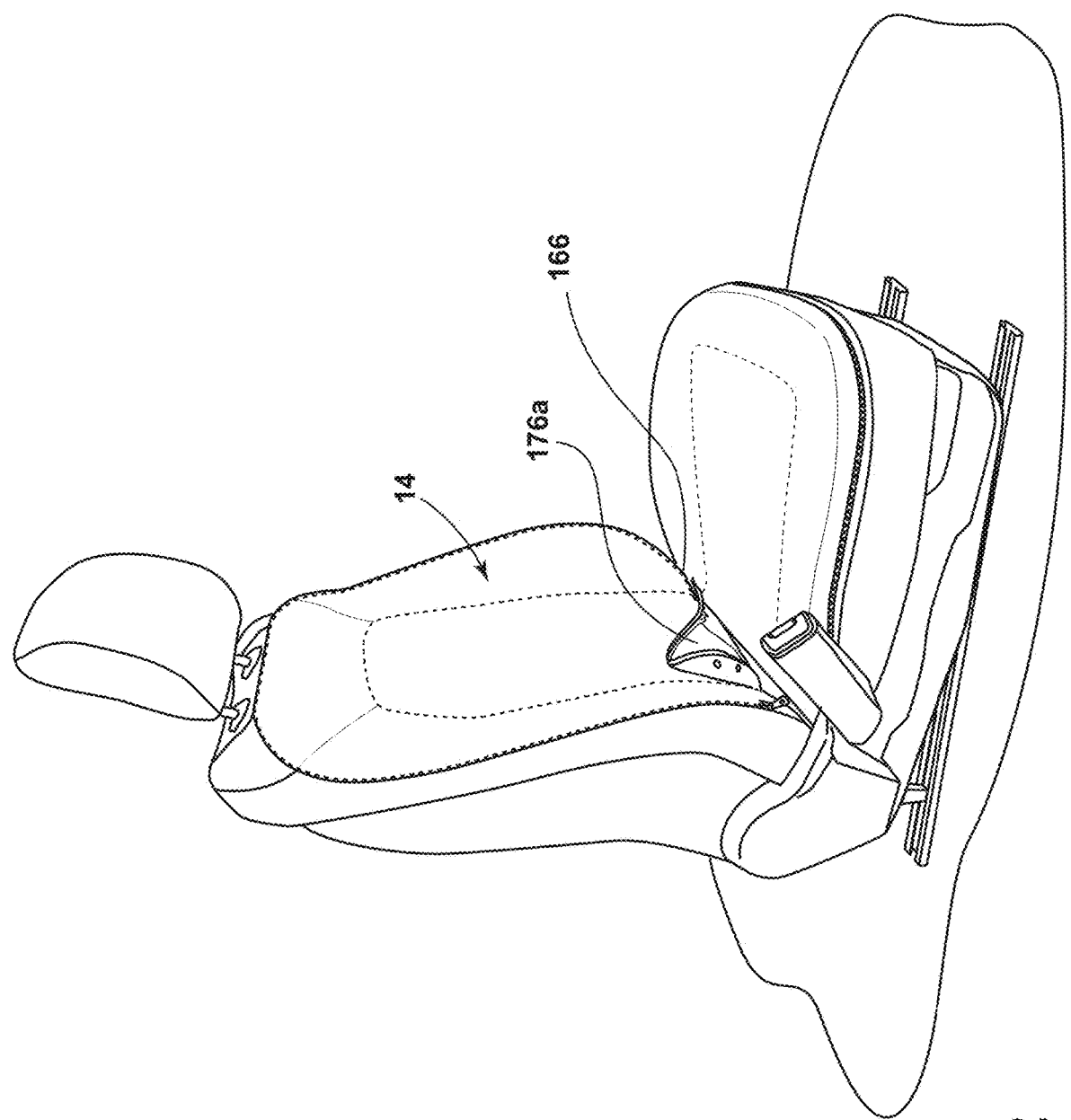
FIG. 12 is a perspective view of a seating assembly with a partially detached seatback cover.

Referring to FIG. 12, the seating assembly 14 is shown with the third fastener part 176a extending from the bite line 166.

Figure 13:
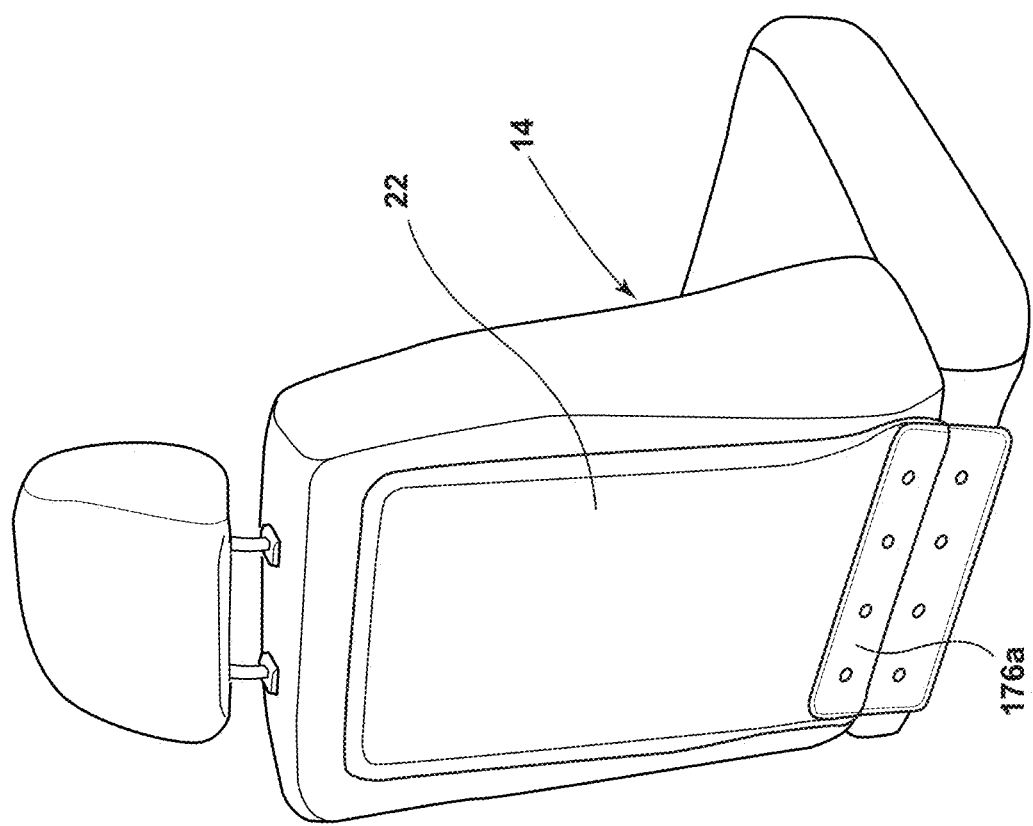
FIG. 13 is a back perspective view of a seating assembly with a seatback cover.

Referring to FIG. 13, a back view of the seating assembly 14 is shown with the third fastener part 176a attached to the seatback 22.

With reference to FIGS. 1-13, the space disposed between the seat cushion 74 and the seatback cushion 94 at the seating assembly 14 bite line 166 may have adequate clearance to minimize the operator effort needed to pass through the seat flap 90a and the seatback flap 110a. Snaps 142a may be used to locate the seat flap 90a on the seat cushion 74. Snaps 192a may be used to locate the seatback flap 110a on the seatback cushion 94. Thus, snaps 142a, 192a may generally consistently locate the seat cover 30 and the seatback cover 34 at designated locations on the seating assembly 14. Snaps 142a, 192a may be minimally degradable with repeated use or variation in assembly. Snaps 142a, 192a may include rattle-free, polyacetal snaps (for example, YKK SP100), which may minimize corrosion. In various examples, the third disengageable seal 138 for the seat 18 and/or the third disengageable seal 188 for the seatback 22 may include hook and loop or other attachments.

FIGS. 14-18 show details relating to attachment of a seat cover 30 to a seat 18 and attachment of a seatback cover 34 to a seatback 22.

Figure 14:
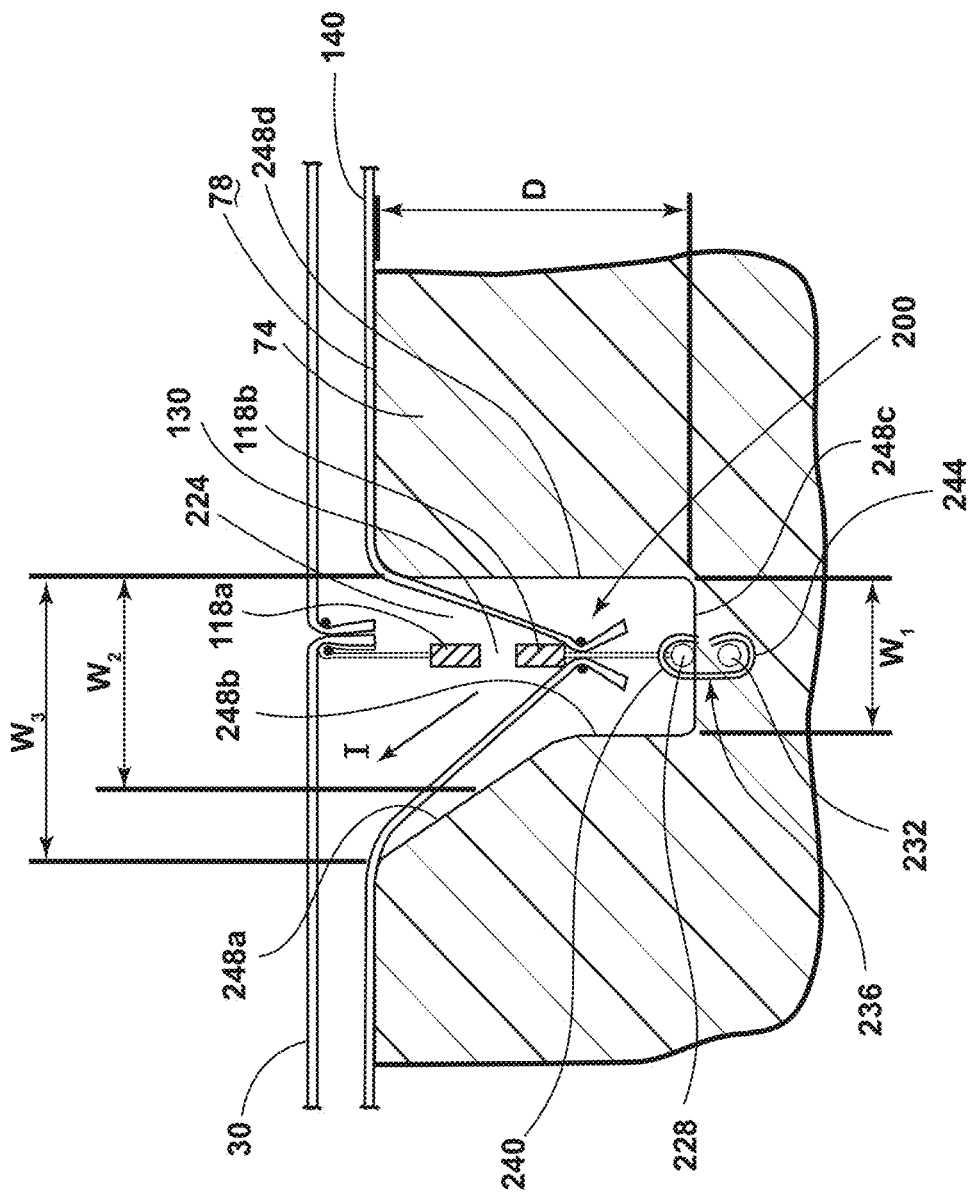
FIG. 14 is a cross-sectional view of a first disengageable seal in a first trench taken along line XIII-XIII of FIG. 2.
Figure 15:
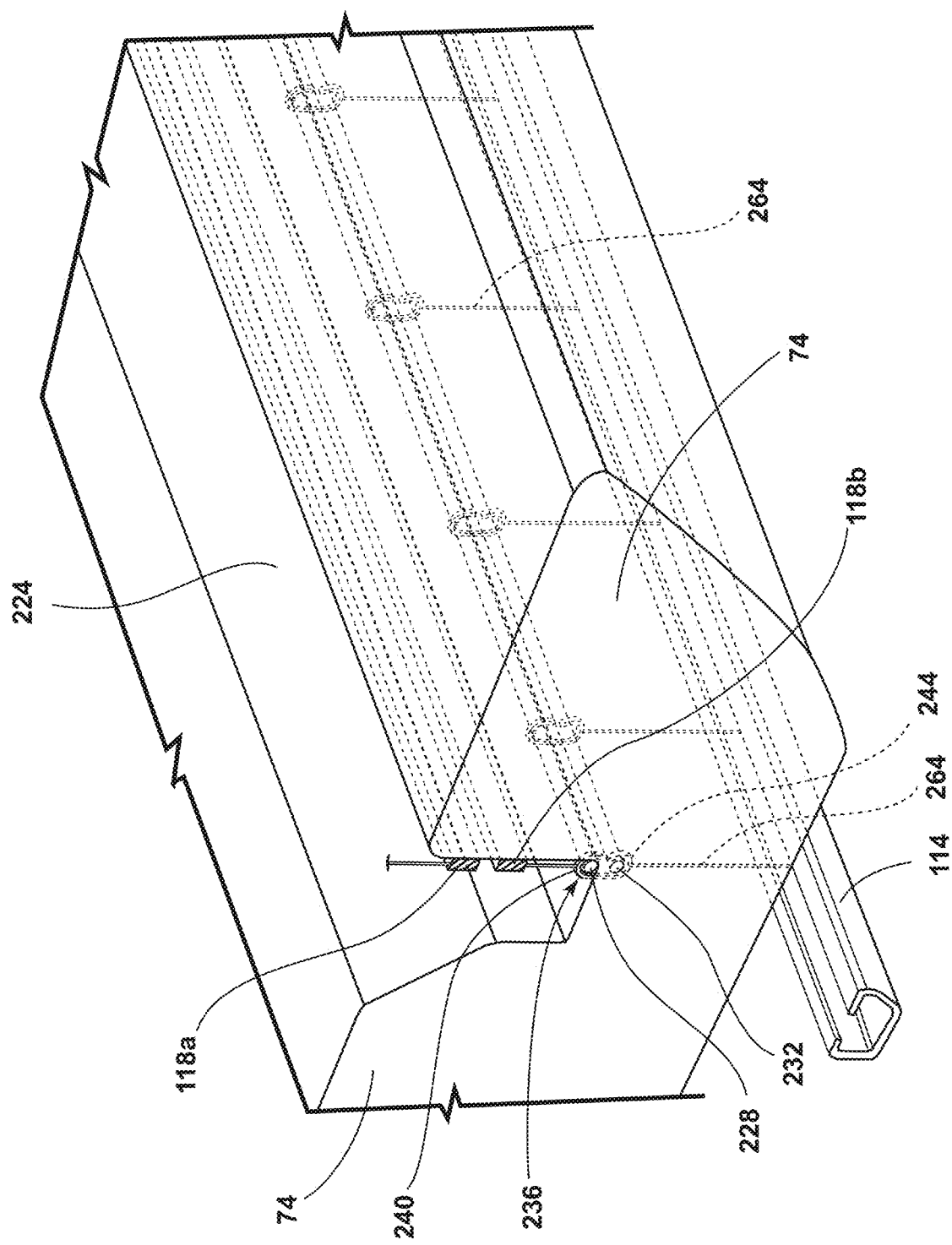
FIG. 15 is a side perspective view of a portion of a seat cushion with a first disengageable seal and an attachment assembly disposed in a first trench.

Referring to FIGS. 14 and 15, an attachment assembly 220 may be disposed in a first trench 224. The first trench 224 may be disposed in the seat 18 or the seatback 22. The first trench 224 may be disposed proximate an inner portion 82b of the seat 18 or an inner portion 102b of the seatback 22. In various examples, the first trench 224 may be disposed proximate a seating assembly 14 cover seam. In various examples, the first trench 224 may be disposed between a bolster and a substantially flat seating surface. In various examples, the first trench 224 may be disposed next to a seating assembly area that includes an airbag, a bladder, or other similar structure that may change the contour of the seating assembly 14. The fixed inner trim seat cover 140 is shown disposed on the seat cushion 74. The fixed inner trim seat cover 140 is shown attached to the primary zipper portion 118b. The removable trim cover of the seat 18 (seat cover 30) is shown attached to the first zipper portion 118a.

With continued reference to FIGS. 14 and 15, in the example shown, the attachment assembly 220 may include the first elongated wire 228, the second elongated wire 232, and the hog ring 236. The primary zipper portion 118b may be attached to a first elongated wire 228. A second elongated wire 232 may be attached to a vehicle interior 10 or a seating assembly frame 112. The first elongated wire 228 is sometimes referred to as a listing wire. A hog ring 236 may attach the first elongated wire 228 to the second elongated wire 232. A hog ring 236 may include a first hook portion 240 and a second hook portion 244. The first hook portion 240 and the second hook portion 244 may oppose each other. The first elongated wire 228 may be disposed in the first hook portion 240. The second elongated wire 232 may be disposed in the second hook portion 244.

Referring again to FIGS. 14 and 15, in the example shown, a first trench 224 may be defined by a first segment 248a, a second segment 248b, a third segment 248c, and a fourth segment 248d. The first segment 248a may include a chamfered segment or a linear segment. The second segment 248b may extend from the bottom of the first segment 248a to a third segment 248c that may define the floor of the first trench 224. In the example shown, the third segment 248c may be linear. The floor of the first trench 224 may have a width $W_1$. A fourth segment 248d may extend from the third segment 248c to the seat surface 78. The third segment 248c may have a length D. The dimension D may indicate the depth of the first trench 224. A rounded corner may be present at the junction of the fourth segment 248d and the seat surface 78. The width of the first trench 224 may be greater at the seat surface 78 than at the floor of the first trench 224. For example, width $W_3$ at the seat surface 78 may be greater than width $W_1$ at the floor of the first trench 224. An intermediate width $W_2$ that is longer than the width $W_1$ at the floor of the first trench 224 and shorter than width $W_3$ at the seat surface 78 may be disposed along the first segment 248a. The distance (for example, $W_2$, $W_3$) between the first segment 248 and the fourth segment 248d may progressively increase in the direction from the floor of the first trench 224 to the seat surface 78.

With continued reference to FIGS. 14 and 15, the primary fastener part 118b may be attached to the first elongated wire 228 by soldering, crimping, or another method. Alternatively, the primary fastener part may include listing pockets for attaching the primary fastener part 118b to the first elongated wire 228. The first fastener part 118a may be joined with the primary fastener part 118b to form a first disengageable seal 130. Arrows I (FIG. 14) indicate the direction in which tension may be applied to the first disengageable seal 130 as the first zipper part 118a of the seatback cover 34 may be joined to the primary zipper part 118b. The depth D of the first trench 224 may be designed to provide for the added width of the first disengageable seal 130 and to prevent occupant discomfort. The outboard upper edge (first segment 248a) of the first trench 224 may be chamfered, or rounded, to reduce the interference between the actuator 302 (FIGS. 19A-19B, 19D) and the outboard wall (first and second segments 248a, 248b) of the first trench 224. Also, in various examples, the first trench 224 may be wider than the hog ring 236.

Referring to FIG. 15, the attachment assembly 220 and the first zipper assembly 130 (first disengageable seal 130) are shown disposed in the first trench 224. The first trench 224 may be disposed in the seat cushion 74. The seat frame 114 may be disposed below the seat cushion 74. The first elongated wire 228 and the second elongated wire 232 are shown disposed along a length of the first trench 224. Hog rings 236 may be disposed along the first and second elongated wires 228, 232. A wire 264 may extend between the hog rings 236 and the seat frame 114. The wire 264 may secure the hog rings 236 to the seat frame 114.

Figure 16:
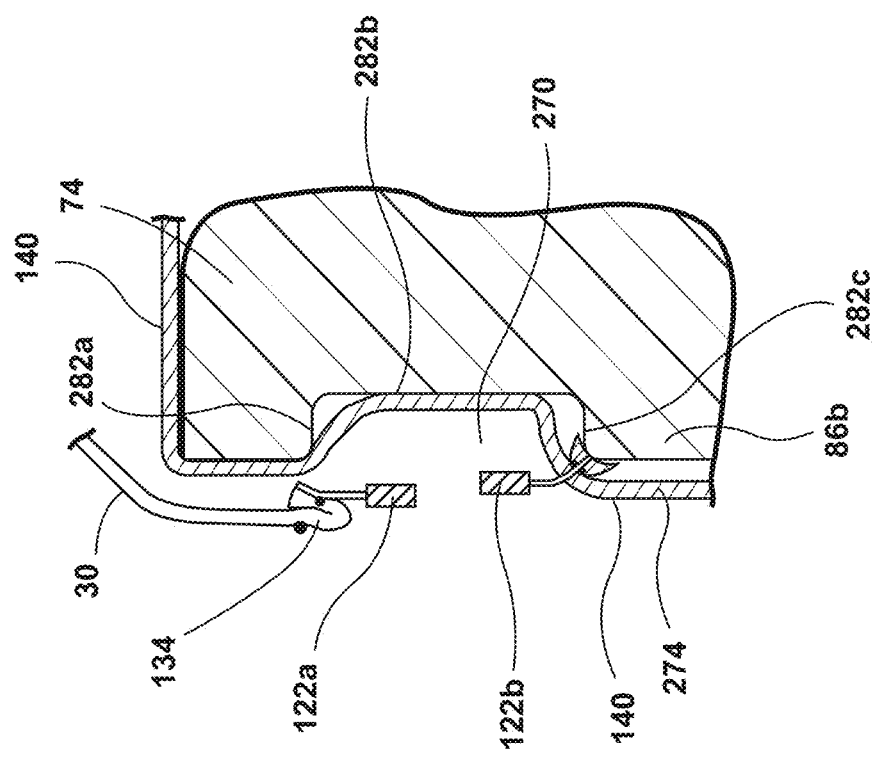
FIG. 16 is a cross-sectional view of a second disengageable seal proximate a second trench taken along line XIV-XIV of FIG. 2.

With reference to FIG. 16, the second disengageable seal 134 (second zipper assembly 134) is shown disposed at an outer portion 86b of the cushion 74. The second disengageable seal 134 may be disposed at an outside perimeter 149 of the cushion 74. The second disengageable seal 134 may be formed when the secondary zipper part 122b coupled to the cushion cover 274 and the second zipper part 122a disposed on the seat cover 30 may be joined. The secondary zipper part 122b may be fastened to a cushion cover 274. The fixed inner trim seat cover 140 is shown disposed on the seat cushion 74. The fixed inner trim seat cover 140 is shown attached to the secondary fastener part 122b. The removable trim cover of the seat 18 (seat cover 30) is shown attached to the second zipper portion 122a. The fixed inner trim seat cover 140 may include the cushion cover 274.

With continued reference to FIG. 16, a second trench 270 may be formed in the seat cushion 74 to provide space for the second disengageable seal 134. The second trench 270 may be referred to as a salvage trench. The second trench 270 and the second disengageable seal 134 may be disposed around the outside perimeter 149 of the seat cushion 74. The second trench 270 may be defined by a first segment 282a, a second segment 282b, and a third segment 282c. The second trench 270 may provide space for movement of the second disengageable seal 134 into and out of the second trench 270.

Figure 17:
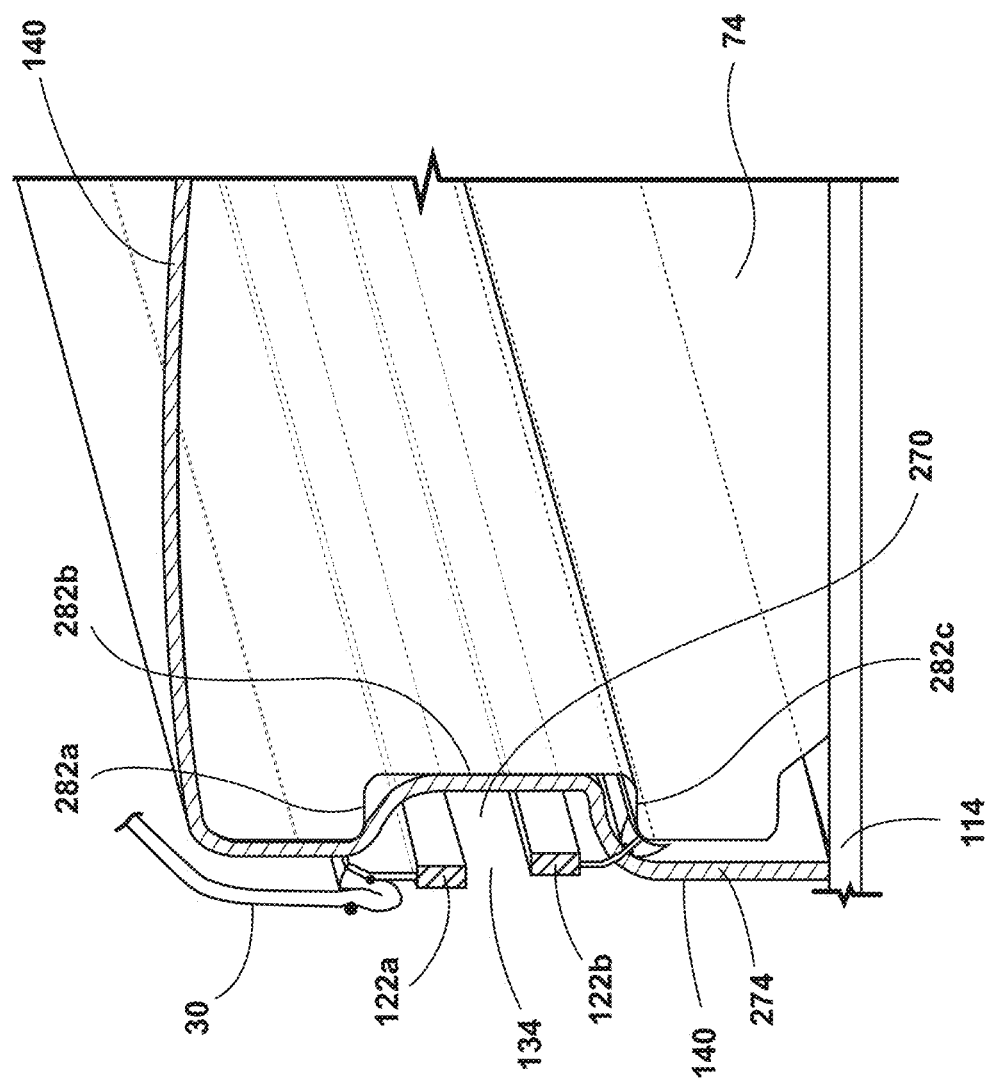
FIG. 17 is a side perspective view of a portion of a seat cushion with a second disengageable seal and an attachment assembly disposed proximate a second trench.

Referring to FIG. 17, the second zipper assembly 134 is shown disposed proximate the second trench 270. The seat frame 114 may be disposed below the seat cushion 74. The secondary fastener part 122b may be attached to a cushion cover 274 that may surround a lower portion of the seat cushion 74. Alternatively, the secondary fastener part 122b may be otherwise attached to the seat cushion 74, the seat frame 114, or another secure location.

FIG. 18 shows a perspective view of a seating assembly 14 without a seating assembly cover 26 and with first and second trenches 224, 270 on the seat cushion 74 and first and second trenches 224, 270 on the seatback cushion 94. The first and second trenches 224, 270 on the seat cushion 74 and the first and second trenches 224, 270 on the seatback cushion 94 may be disposed behind first and second zipper assemblies 130, 180 and 134, 184.

The geometries and positions of the first and second trenches 224, 270 on the seat cushion 74 and the seatback cushion 94 may be designed to facilitate convenient and efficient operation of the first and second zipper assemblies 130, 180 and 134, 184. In general, location of zipper assemblies on seating surfaces with compound curves may cause the zipper assemblies or individual zipper ribbons to buckle. Also, lateral curvature of a zipper geometry may constrain the placement of a zipper assembly on a seating surface. Zipper assemblies may be supported by a smooth surface with minimal steps. Zipper assemblies may be supported by a continuous surface with minimal interruptions. Thus, the contours of the first and second trenches 224, 270 disposed on the seat 18 and the seatback 22 may be designed to optimize first and second zipper assembly 130, 180 and 134, 184 function.

Accordingly, with reference to FIGS. 14-18, the first and second trenches 224, 270 disposed on the seat 18 and the seatback 22 may be designed to allow fluid actuation of the respective first and second zipper assemblies 130, 180 and 134, 184 while generating sufficient tension in the seating assembly cover 26 when the seating assembly cover 26 may be attached to the seating assembly 14.

Figure 19B:
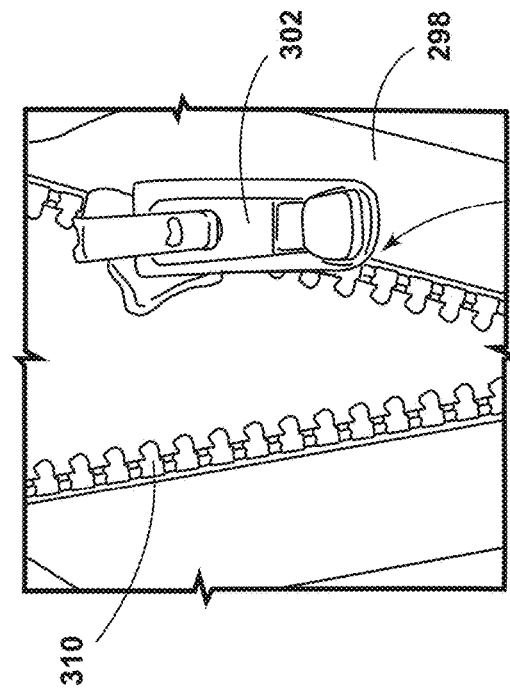
FIG. 19B is a perspective view of a zipper assembly having a molded construction.
Figure 19D:
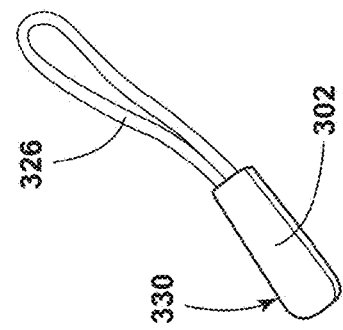
FIG. 19D is an elevational view of an actuator of a zipper assembly.
Figure 19A:
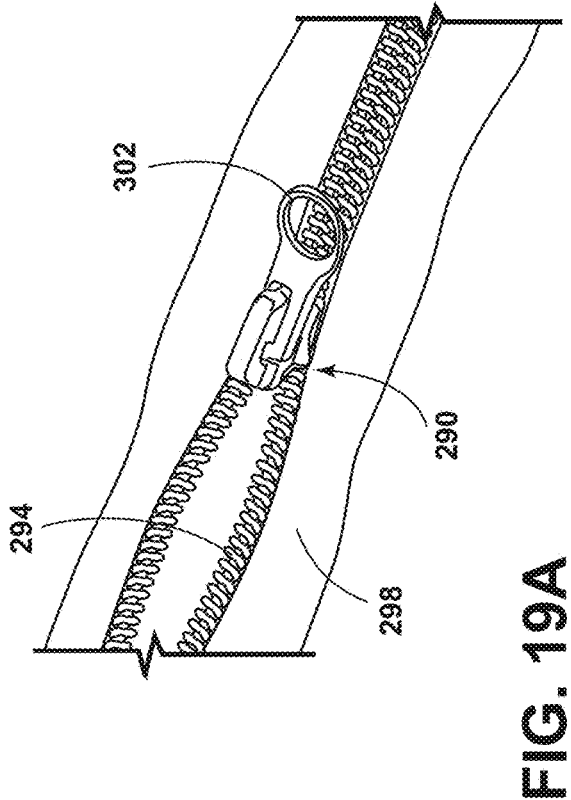
FIG. 19A is a perspective view of a zipper assembly having a coiled construction.

With reference to FIGS. 19A-19D, exemplary zipper assemblies are shown. Referring to FIG. 19A, a zipper assembly 290 having a coiled construction is shown. The zipper assembly 290 having a coiled construction may include coils 294, ribbons 298, and an actuator 302. Referring to FIG. 19B, a zipper assembly 306 having a molded construction is shown. The zipper assembly 306 having a molded construction may include teeth 310, ribbons 298, and an actuator 302. The zipper assembly 306 having a molded construction may include teeth 310 that may be centered in a zipper ribbon 298.

With reference to FIGS. 19A and 19B, various combinations of zipper assemblies 290 having a coiled construction and zipper assemblies 306 having a molded construction may be used for the first and second zipper assemblies 130, 134 and 180, 184 of the respective seat cover 30 and the seatback cover 4. A zipper assembly 306 having a molded construction may operate more smoothly than a zipper assembly 290 having a coiled construction. In some examples, the first and second zipper assemblies 130, 180 and 134, 184 may have a coiled construction. In one example, a zipper assembly 306 having a molded construction may be used for the first zipper assembly 130, 180 and a zipper assembly 290 having a coiled construction may be used for the second zipper assembly 134, 184.

In some examples, for reduced binding and generally smooth operation, the coil side of the secondary zipper part may be oriented outward and away from the surface of the cushion (seat cushion 74 or seatback cushion 94) foam. When a ribbon 298 with a coil 294 is used for the primary zipper part, then a coil side of the ribbon 298 may be oriented toward the outer wall (comprised of first and second segments 248a, 248b) of the first trench 224. Orienting a ribbon 298 with its coil facing outward may force the coil 294 to expand. A ribbon 298 having a coil 294 may be oriented with the coil 294 in a neutral or expanded condition. In various water repellant applications, a zipper assembly 290 having a coiled construction may be oriented with the coils facing toward the foam with a ribbon 298 having polyurethane film coated tape facing outward from the foam. For attachment of the seat cover 30 to the fixed cushion cover 274 on the lower portion of the cushion (i.e., along the second zipper assembly 134, 184), a No. 5 coil fire retardant zipper construction may be used. The No. 5 coil fire retardant zipper construction may offer a combination of low cost, strength, flexibility and availability.

Figure 19C:
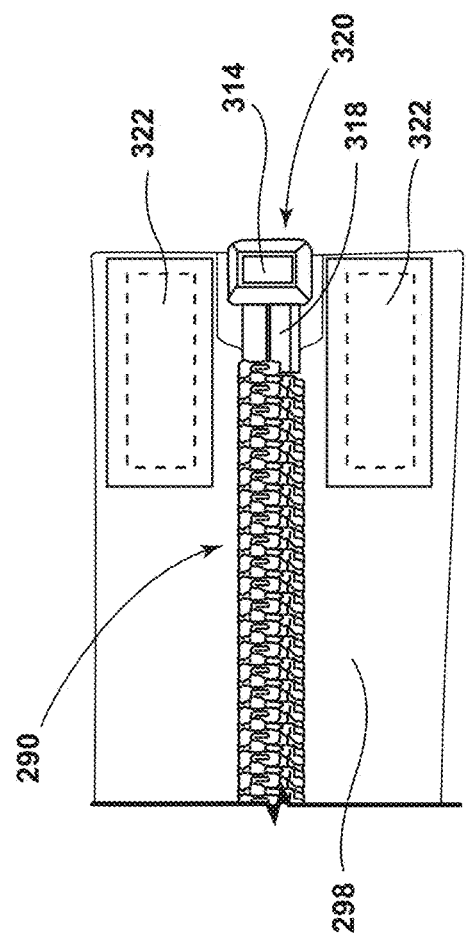
FIG. 19C is an elevational view of a portion of a zipper assembly.

With continued reference to FIG. 19C, a zipper assembly may include a box 314, a pin 318, and stiffeners 322. For ease of use, a box 314 and a pin 318 of the first and second zipper assemblies 130, 180, and 134, 184 may be engaged on the outboard side of the seating assembly 14. The actuator 302 may move to the fully closed position on the inboard side of the seating assembly 14. The outboard side of the seating assembly 14 generally relates to the side of the seating assembly 14 located closer to a vehicle door. The inboard side of the seating assembly 14 generally relates to the side of the seating assembly 14 located closer to a vehicle interior 10.

The location of the zipper start 320 on the outboard side of the seating assembly 14 may improve the ease of engaging the zipper box 314 and the zipper pin 318 proximate the door opening. With exemplary reference to the seat 18, at the zipper start 320 of the first zipper assembly 130, small stiffeners 322 may be sewn into the primary zipper part 118b and the first zipper part 118a. Similarly, at the start of the second zipper assembly 134, small stiffeners 322 may be sewn into the secondary zipper part 122b and the second zipper part 122a.

With reference to FIG. 19D, an actuator 302 for a zipper assembly 130, 134 may include a cord 326 and a pull tab 330. The actuator 302 may have a length that is convenient for an operator to grab. An actuator 302 may include a contrasting high visibility color pull cord 326. The cord 326 may be soft.

Figure 20:
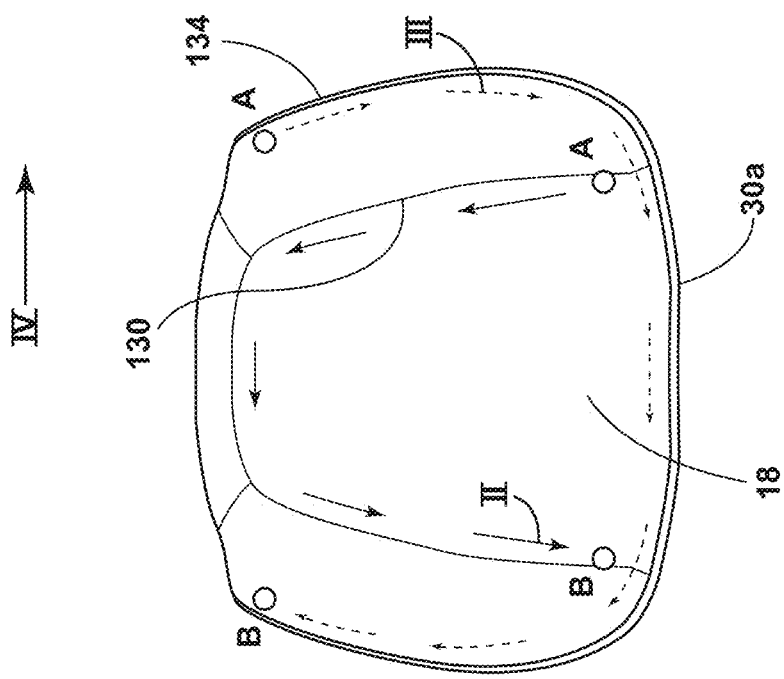
FIG. 20 is a top elevational view of a seat cover showing the directions of fastener actuation.

Referring now to FIG. 20, an example of a seat cover 30a is shown. Arrows II may indicate the direction of attachment of the first zipper assembly 130 to the seat surface 78. Arrows III may indicate the direction of attachment of the second zipper assembly 134 to the seat surface 78. Arrow IV may indicate the outboard direction of the seat 18 relative to the vehicle. During the seat cover 30a attachment process, an operator may attach the seat cover 30a to the seat surface 78 with the first zipper assembly 130 prior to attaching the seat cover 30a to the seat surface 78 with the second zipper assembly 134.

Figure 21:
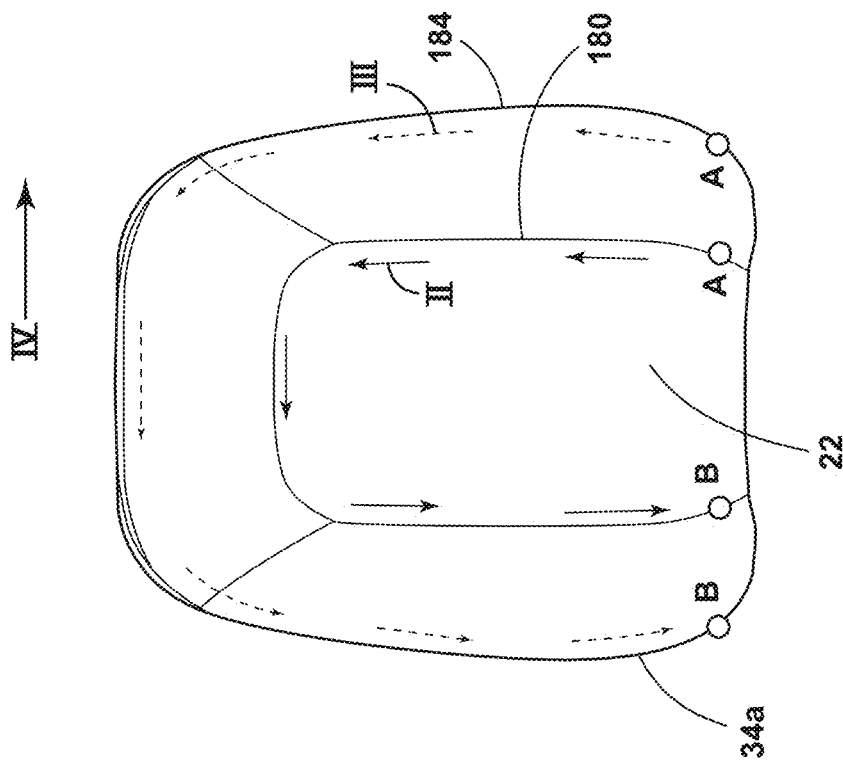
FIG. 21 is a top elevational view of the seatback cover showing the directions of fastener actuation.

Referring now to FIG. 21, an example of a seatback cover 34a is shown. Arrows II indicate the direction of attachment of the first zipper assembly 180 to the seatback surface 98. Arrows III direct the direction of attachment of the second zipper assembly 184 to the seatback surface 98. Arrow IV may indicate the outboard direction of the seatback 22 relative to the vehicle. During the seatback 22 cover attachment process, an operator may attach the seatback cover 34a to the seatback surface 98 with the first zipper assembly 180 prior to attaching the second zipper assembly 184 to the seatback surface 98.

Referring now to FIGS. 22A-22D, examples of several seatback covers are shown. The seatback 22 covers include various configurations of first disengageable seals 180 on seatback covers. It is contemplated that the examples of several seatback cover shown in FIGS. 22A-22D may also include second disengageable seals 184 disposed around outer portions of the seatback covers.

Figure 22B:
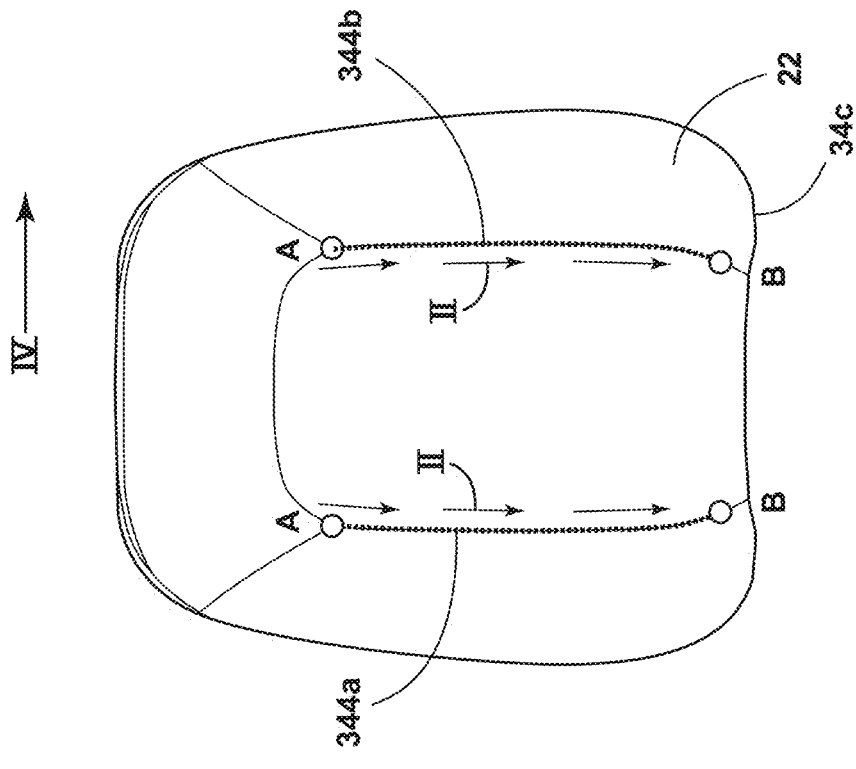
FIG. 22B is a front elevational view of a seatback cover showing the directions of fastener actuation.
Figure 22A:
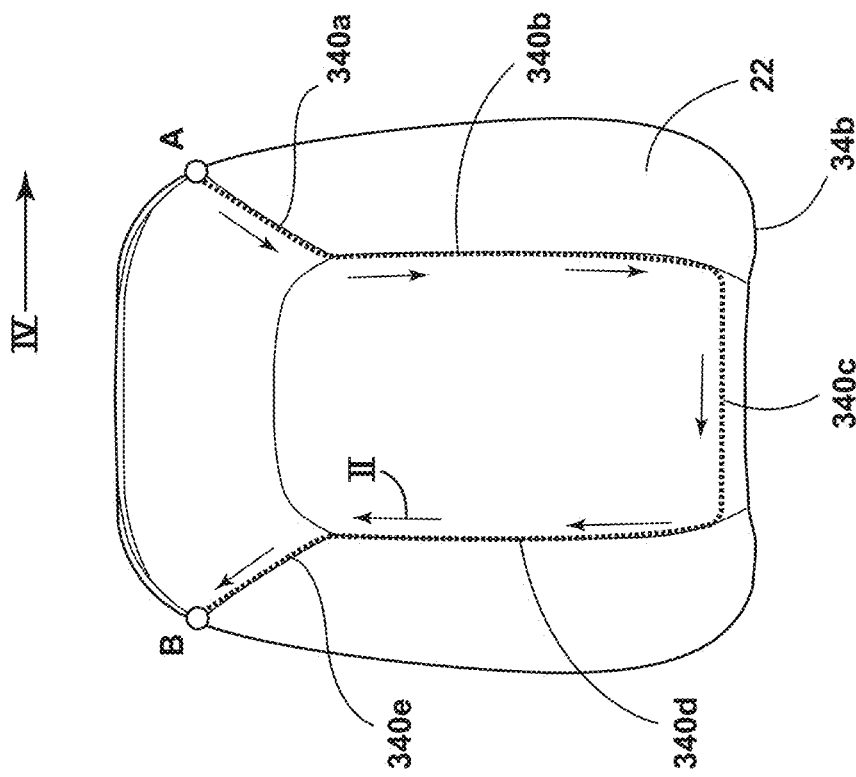
FIG. 22A is a front elevational view of a seatback cover showing the directions of fastener actuation.

Referring to FIG. 22A, seatback cover 34b is shown. The first disengageable seal 180 may be joined together in the direction shown by arrows II. An actuator 302 may be pulled from a starting point A disposed at an upper portion of the seatback 22. The actuator 302 may be pulled along a first segment 340a that may extend inwardly and diagonally from the starting point A. A latitudinal second segment 340b may extend downward from the first segment 340a. A lateral third segment 340c may extend along a bottom portion of the seatback 22. A latitudinal fourth segment 340d may extend upward from the third segment 340c. A fifth segment 340e may extend outwardly and diagonally to an ending point B disposed on the first side of the seatback 22.

Referring to FIG. 22B, another example of a configuration of a first disengageable seal 180 on a seatback cover 34c is shown. A seatback cover 34c may include a first disengageable seal 180 that may include a first longitudinal part 344a and a second longitudinal part 344b. The first and second longitudinal parts 344a, 344b may be substantially parallel to one another. Each of the first and second longitudinal parts 344a, 344b may include a starting point A disposed at an upper portion of the seatback 22 and an ending point B may be disposed at a lower portion of the seatback 22. For each of the first and second longitudinal parts 344a, 344b, an operator may pull a fastener in the direction II shown by arrows from a starting point A disposed at an upper portion of the seatback 22 to an ending point B disposed at a lower portion of the seatback 22.

Referring to FIG. 22C, another example of a configuration of a first disengageable seal 180 on a seatback cover 34d is shown. A seatback cover 34d may include a first disengageable seal 180 that may include a first longitudinal part 344a and a second longitudinal part 344b. The first and second longitudinal parts 344a, 344b may be substantially parallel to one another. Each of the first and second longitudinal parts 344a, 344b may include a starting point A disposed at a top edge of the seatback 22 and an ending point B may be disposed at a lower portion of the seatback 22. For each of the first and second longitudinal parts 344a, 344b, an operator may pull an actuator 302 in the direction shown by arrows II from a starting point A disposed at a top edge of the seatback 22 to an ending point B disposed at a lower portion of the seatback 22.

Referring to FIG. 22D, another example of a configuration of a first disengageable seal on a seatback cover 34e is shown. A seatback cover 34e may include a first disengageable seal that may include a first substantially longitudinal part 344a and a second substantially longitudinal part 344b. The first substantially longitudinal part 344a may include a starting point A disposed at the first side of the upper portion of the seatback cover 34e. A first segment 344a-1 may extend diagonally inward from the starting point A. A second segment 344a-2 may extend longitudinally downward to the ending point B. The second substantially longitudinal part 344b may include a starting point A disposed at the second side of the upper portion of the seatback cover 34e. A first segment 344b-1 may extend diagonally inward from the starting point A. A second segment 344b-2 may extend longitudinally downward to the ending point B. For each of the first and second substantially longitudinal parts 344a, 344b, an operator may pull an actuator 302 in the direction shown by arrows II from a starting point A disposed at an upper portion of the seatback 22 to an ending point B disposed at a lower portion of the seatback 22.

Figure 23:
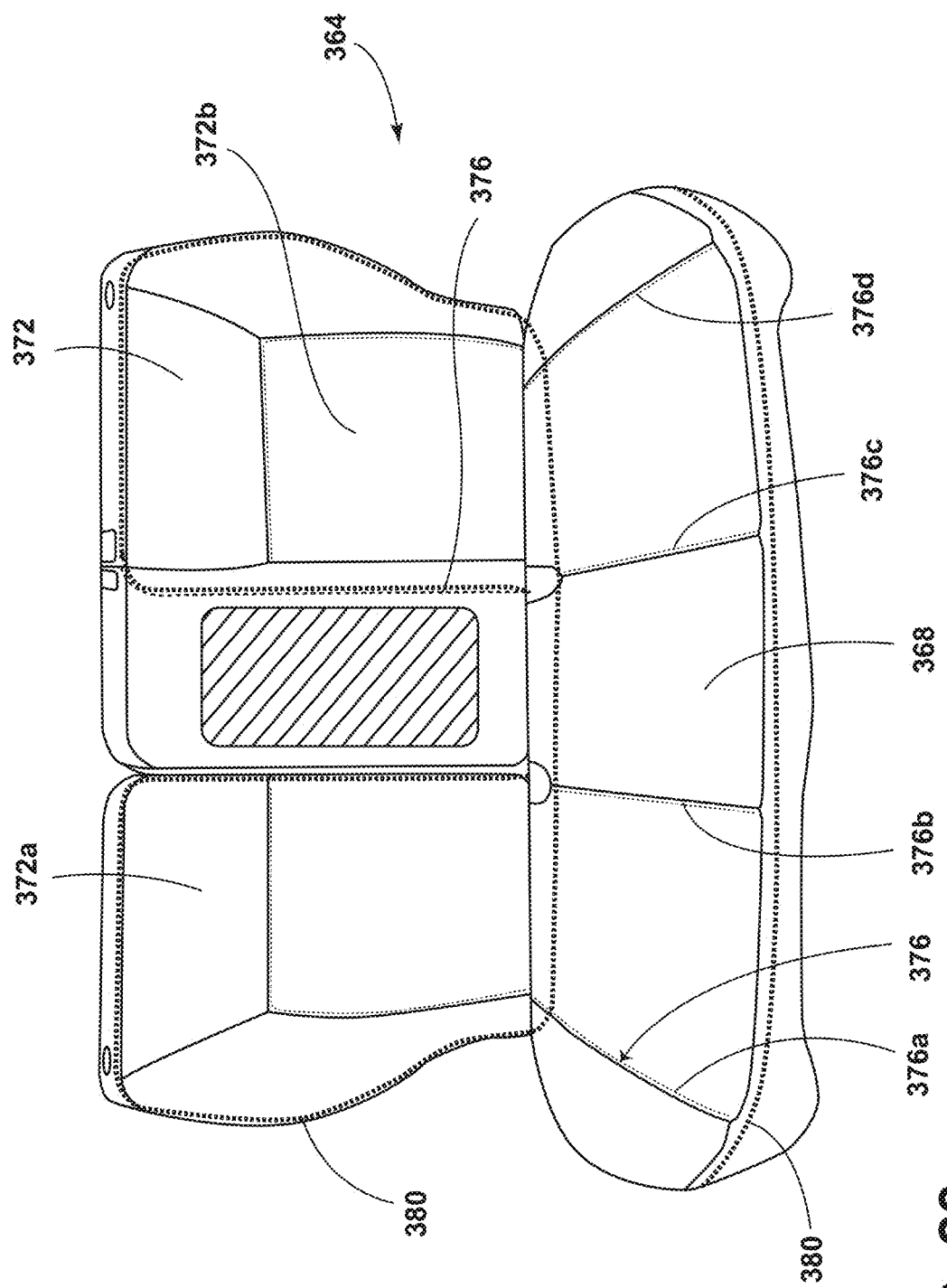
FIG. 23 is a perspective view of a bench seating assembly and bench seating assembly cover.

Referring now to FIG. 23, a bench seating assembly 364 with various zipper covers is shown. The bench seating assembly 364 may include a bench seat 368 and a bench seatback 372. The bench seatback 372 may be a split into first and second parts 372a, 372b. The first and second parts 372a, 372b of the bench seatback 372 may be individually and simultaneously rotatable relative to the bench seat 368. The bench seat 368 may include a first disengageable seal 376 having a first part 376a, a second part 376b, a third part 376c, and a fourth part 376d. The bench seat 368 may also include a second disengageable seal 380 disposed around an outer portion of the cushion of the bench seat 368. The bench seatback 372 may include a first disengageable seal 376 and a second disengageable seal 380.

With continued reference to FIG. 23, the bench seating assembly 364 may include first and second trenches 224, 270 (not shown) disposed behind the respective first and second disengageable seals 376, 380. The zipper covers of the bench seating assembly 364 may be designed to leave uncovered difficult-to-trim areas (for example, headrest guide post access areas, seatbelt pockets, armrest cavity, seatbelt retractor tower, dump latch bezel). The aforementioned difficult-to-trim areas may be located on the fixed inner trim of the bench seating assembly.

In various examples, the seat cushion 74 and the seatback cushion 94 may be examples of intermediate members. Intermediate members may be seat 18 and seatback 22 parts that the seat cover 30 and the seatback cover 34 may be disposed on. Intermediate members may include hard seating surfaces, mesh seating surfaces, sling seating surfaces, and other seating surfaces.

In various examples, a vehicle member may include a seat frame 114, a seatback frame 116, a vehicle floor 54, a vehicle interior side panel, or other vehicle portion. The attachment assembly 220 that may be disposed in the first trench 224 may be secured to the vehicle member.

A variety of advantages may be derived from the present disclosure. The seat cover and the seatback covers may include combinations of features designed to optimize craftsmanship, durability, and operator friendliness. The use of one or more disengageable seals for attaching the seating assembly cover to the seating assembly may have numerous benefits. The first disengageable seal may automatically position the respective seat or seatback cover on the respective seat or seatback cushion. The use of a first zipper assembly and a second zipper assembly that may each include separate zippers may allow for consistent, repeatable craftsmanship, independent of the skill level of the operator. The use of the first zipper assembly may provide positive, high strength attachments between the removable seat or seatback cover and the seat or seatback. High strength attachments may provide cover pattern developers freedom to fit and tighten the seat and seatback covers while minimizing the possibility of inadvertent detachment of the seat or seatback cover from the seat or the seatback. Tight attachment of the seat or seatback cover to the respective seat or seatback may reduce wear of the seat or seatback cover and may improve durability of the seat or seatback cover. High strength attachments may limit the mobility of seat or seatback cover and may reduce the stretch and distortion of the seat or seatback cover that occurs with use. Location of the first and second trenches behind the first and second zipper assemblies facilitates efficient zipper assembly operation and a smoother seat and seatback surface.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
    a cushion including:
        a seating surface;
        an elongated trench extending into the seating surface and including:
            an interior sidewall substantially transverse to the seating surface and an exterior sidewall having a first segment substantially parallel to the interior sidewall and a second segment extending at an angle from the first segment towards an outer portion of the seating surface;
        a primary fastener part disposed in the elongated trench; and
        a secondary fastener part disposed along a cushion perimeter and adjacent a U-shaped recess extending along the cushion perimeter and into the cushion; and
    a cover including:
        first and second fastener parts,
    wherein the primary fastener part and the first fastener part are selectively attachable to form a first disengageable seal, and
    wherein the secondary fastener part and the second fastener part are selectively attachable to form a second disengageable seal.

2. The vehicle seating assembly of claim 1, further comprising a supporting structure disposed behind the cushion.

3. The vehicle seating assembly of claim 2, further comprising an attachment assembly extending between the primary fastener part disposed in the elongated trench and the supporting structure.

4. The vehicle seating assembly of claim 3, wherein the attachment assembly includes:
    a hog ring,
    a first elongated member, and
    a second elongated member.

5. The vehicle seating assembly of claim 4, wherein the hog ring includes opposing first and second hook portions, wherein the first elongated member is disposed in the first hook portion, and wherein the second elongated member is disposed in the second hook portion.

6. The vehicle seating assembly of claim 5, wherein the primary fastener part is attached to the first elongated member.

7. The vehicle seating assembly of claim 6, wherein the second elongated member includes a wire and wherein the wire is attached to the supporting structure.

8. The vehicle seating assembly of claim 7, wherein the supporting structure includes a seating assembly frame.

9. The vehicle seating assembly of claim 3, wherein the primary and secondary fastener parts comprise primary and secondary zipper parts and wherein the first and second fastener parts comprise first and second zipper parts.

10. The vehicle seating assembly of claim 9, wherein the first disengageable seal includes a first zipper assembly and wherein the second disengageable seal includes a second zipper assembly.

11. The vehicle seating assembly of claim 10, wherein the seating surface comprises at least one of a seat surface and a seatback surface.

12. The vehicle seating assembly of claim 1, wherein the angle is within an approximate range of between approximately 15.0 degrees and approximately 45.0 degrees.

13. A vehicle seating assembly comprising:
    a supporting structure;
    an intermediate member including:
        a seating surface;
        a removable cover;
        a selectively engageable first zipper assembly;
        a selectively engageable second zipper assembly;
        a first trench having:
            an internal portion having:
                an interior sidewall of the internal portion;
                an exterior sidewall of the internal portion; and
                a substantially constant width measured transverse to the interior sidewall of the internal portion and between the interior sidewall of the internal portion and the exterior sidewall of the internal portion; and
            an external portion having:
                an interior sidewall of the external portion substantially transverse to the seating surface;
                an exterior sidewall of the external portion defined by a chamfer extending from the interior sidewall of the internal portion to the seating surface; and
                a progressively increasing width measured transverse to the interior sidewall of the external portion and from the interior sidewall of the internal portion to the seating surface, wherein the progressively increasing width is defined by the distance between the interior sidewall of the external portion and the chamfer of the exterior sidewall of the external portion; and
        a second trench forming:
            a U-shaped recess in the intermediate member,
    wherein the first zipper assembly extends between the removable cover and an attachment assembly disposed in the first trench and secured to the supporting structure, and wherein the second zipper assembly extends between the removable cover and the intermediate member.

14. The vehicle seating assembly of claim 13, wherein the intermediate member includes a cushion, wherein the first trench is disposed in an inner portion of the cushion, and wherein the second trench is disposed in an outer portion of the cushion.

15. The vehicle seating assembly of claim 14, wherein a primary zipper part of the first zipper assembly is disposed in the first trench.

16. The vehicle seating assembly of claim 13, further comprising:

a disengageable seal disposed between the cover and the seating surface.

17. The vehicle seating assembly of claim 13, wherein a length of the interior sidewall of the external portion of the first trench is greater than a length of the interior sidewall of the internal portion of the first trench.

18. A vehicle seating assembly comprising:
a cover including:
first and second zipper parts; and
a cushion including:
a first elongated trench for receiving an attachment assembly extending from the cushion and coupled to a primary zipper part and including:
a depth defined by a substantially vertical distance between a trench floor and a cushion surface;
a first outer wall segment extending from the trench floor toward the cushion surface in a direction substantially transverse to the trench floor; and
a second outer wall segment extending between the first outer wall segment and the cushion surface and forming a chamfer between the first outer wall segment and the cushion surface; and
a second elongated trench including a U-shaped indentation proximate a secondary zipper part,
wherein the first zipper part and the primary zipper part are selectively attachable, and
wherein the second zipper part and the secondary zipper part are selectively attachable.

19. The vehicle seating assembly of claim 18, wherein the first zipper part and the primary zipper part form a first zipper assembly, wherein the second zipper part and the secondary zipper part form a second zipper assembly, wherein the second elongated trench extends around a portion of the outer perimeter of the cushion, wherein the second zipper assembly is disposed over the second elongated trench, and wherein the U-shaped indentation is defined by a pair of opposing wall segments extending into the cushion and away from the cushion surface and a wall segment extending between the pair of opposing wall segments and substantially parallel to the cushion surface.

20. The vehicle seating assembly of claim 18, wherein the chamfer extends into at least one fifth of the depth of the first trench.

* * * * *